United States Patent [19]
Murase et al.

[11] Patent Number: 6,154,218
[45] Date of Patent: *Nov. 28, 2000

[54] METHOD FOR GENERATING, MANAGING AND DISPLAYING INFORMATION RETRIEVAL DATA ON INFORMATION PROCESSING SYSTEM

[75] Inventors: Atsushi Murase, Yokohama; Tetsuo Tanaka; Motoaki Satoyama, both of Sagamihara; Toshiaki Kohno, Machida; Kenji Kawasaki, Yokohama; Yoshiaki Morimoto, Chigasaki; Akira Tanaka, Yokohama, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/826,976

[22] Filed: Apr. 9, 1997

Related U.S. Application Data

[63] Continuation of application No. 08/443,037, May 17, 1995, Pat. No. 5,657,433.

[30] Foreign Application Priority Data

| | | | |
|---|---|---|---|
| May 19, 1994 | [JP] | Japan | 6-105497 |
| Jun. 13, 1994 | [JP] | Japan | 6-130490 |
| Jun. 27, 1994 | [JP] | Japan | 6-144907 |

[51] Int. Cl.$^7$ ........................ G06F 15/00
[52] U.S. Cl. ........................ 345/433
[58] Field of Search ........................ 345/442, 433; 395/761, 433; 707/103, 104, 102

[56] References Cited

U.S. PATENT DOCUMENTS

| | | | |
|---|---|---|---|
| 5,544,298 | 8/1996 | Kanavy et al. | 395/155 |
| 5,642,490 | 6/1997 | Morgan et al. | 345/342 |
| 5,877,775 | 3/1999 | Theisen et al. | 345/440 |

*Primary Examiner*—Phu K. Nguyen
*Attorney, Agent, or Firm*—Antonelli, Terry, Stout & Kraus, LLP

[57] ABSTRACT

An information processing system includes a device for recording data, a device for generating browsing data, a device for storing the browsing data and data in association with each other, and a device for displaying the browsing data. Corresponding data are retrieved from the displayed browsing data. In the case where the data is non-visible such as audio data, a still image input unit or a video input device is used to create browsing data. Also, upon creation, updating or deletion of data, the browsing data are automatically created, updated or deleted respectively. When the data is AV data, browsing data is created on the basis of the information detected by a scene change point detector and a volume detector.

5 Claims, 33 Drawing Sheets

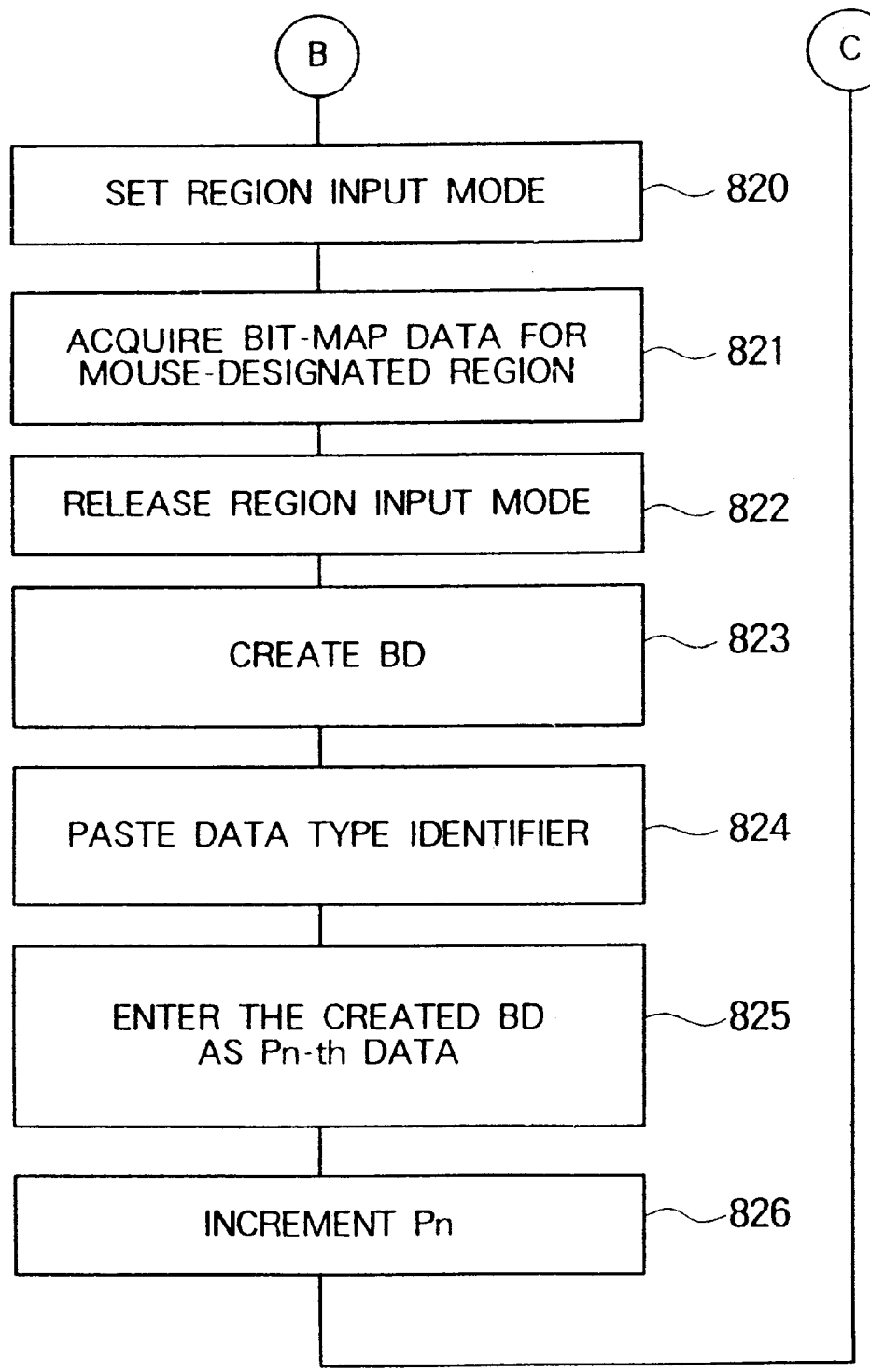

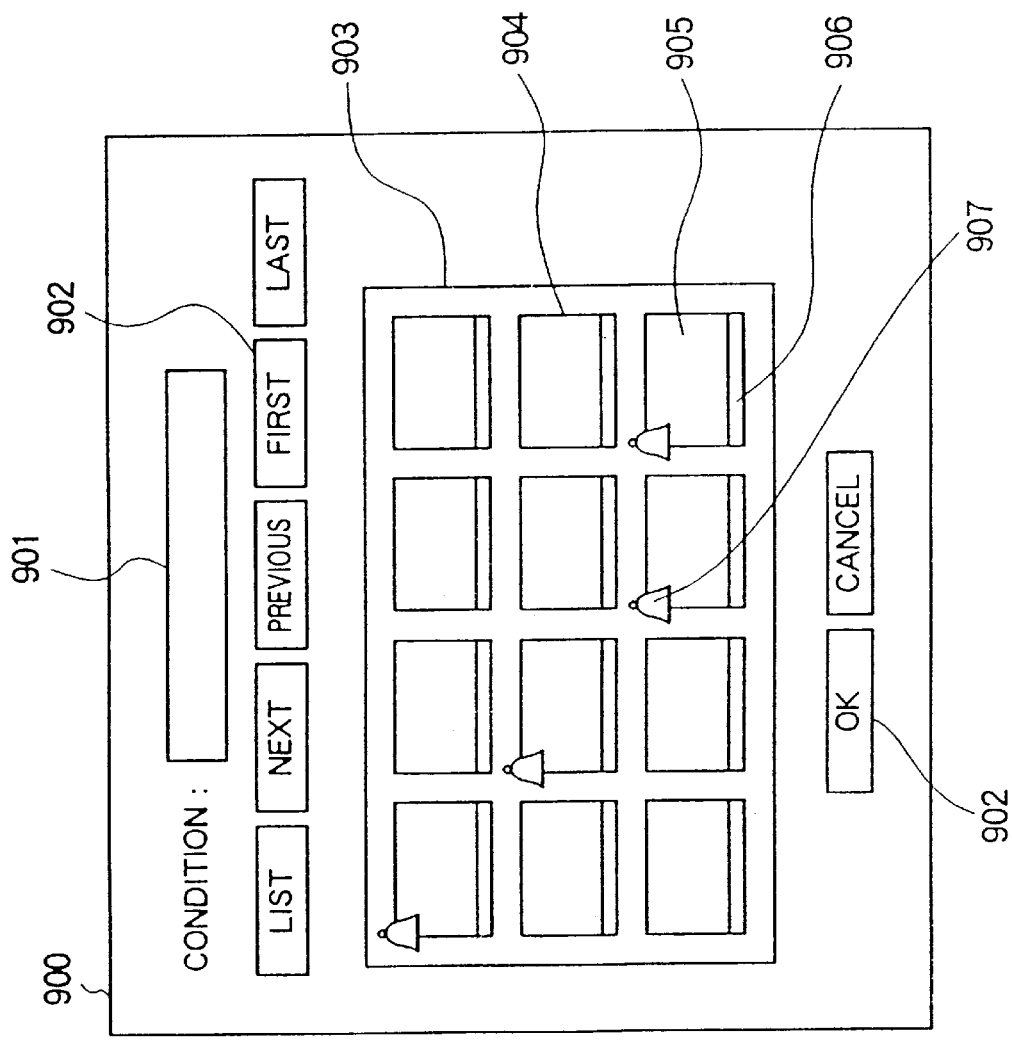

FIG. 18

| FILE NAME 1801 | OWNER 1802 | OWNER'S ACCESS RIGHT 1803 | ACCESS RIGHT OF OTHER THAN OWNER 1804 | LAST UPDATE DATE/TIME 1805 | AP NAME 1806 |
|---|---|---|---|---|---|
| | | | | | |
| | | | | | |
| | | | | | |
| | | | | | |
| | | | | | |

"WRITE ONLY"
OR
"READ ONLY"
OR
"READ/WRITE"
OR
"CANNOT ACCESS"

YR/MTH/DAY/HR/MIN/SEC

FIG. 28

| SCENE END FRAME NO. | SCENE LENGTH | AVERAGE VOLUME | MVFN | MV | MVDFN | MVD |
|---|---|---|---|---|---|---|
| | | | | | | |
| | | | | | | |
| . . . | . . . | . . . | . . . | . . . | . . . | . . . |
| | | | | | | |

2801 / 2802 / 2803 / 2804 / 2805 / 2806 / 2807

2104 SCT

FIG. 29

| MV | MVD | FIRST FRAME NO. | LAST FRAME NO. |
|---|---|---|---|
| ... | ... | ... | ... |

2902  2903  2904  2905

2105 SST

SAMPLING

QUANTIZATION
(3 BITS)

ENCODING

METHOD FOR GENERATING, MANAGING AND DISPLAYING INFORMATION RETRIEVAL DATA ON INFORMATION PROCESSING SYSTEM

CROSS-REFERENCE TO RELATED APPLICATION

The present application relates to U.S. patent application Ser. No. 08/271,923 filed on Jul. 7, 1994. The disclosure of that application is incorporated herein by reference.

This application is a Continuation of application Ser. No. 08/443,037, filed May 17, 1995 now U.S. Pat. No. 5,657,433.

BACKGROUND OF THE INVENTION

1. Field of the Invention

The present invention relates to an information processing system such as a work station and a personal computer for creating, storing, reproducing and retrieving a wide variety of media-type data such as texts, graphics, images, video and voices.

2. Description of the Related Art

In an information processing system such as a work station and a personal computer, a wide variety of media-type data created or input are stored in a disk in the form of a file. The user retrieves and uses the data from the disk whenever required. Means for allowing the user to acquire data include, for example, allocating a file name in textual form or icons in graphics to the data and displaying a list thereof whereby the user is allowed to designate intended data, or retrieving an intended data from the disk containing a great amount of data using an associated keyword or the like.

In the "information processing system" cited in the Cross-Reference, a bit-map image of data is compressed and a list of the browsing data (BD) is displayed, thereby permitting retrieving operation. A plurality of bit-map images can be entered with respect to a single datum and can be sequentially displayed in the same area. The browsing data can be created without changing the application program (AP) with which the data is created. The browsing data is a compression of a bit-map image of the data, and therefore an application program need not be invoked anew for confirming the contents.

According to JP-A-3-292572, portions of the video data associated with occurrence of a scene change are detected, and a preceding or succeeding frame of each scene change point is entered into a browsing list as a browsing image. All of these frames are listed and displayed at the time of retrieval. The "scene" is defined as a collection of frames in which video data images are picked up continuously. The portion of occurrence of a scene change is assumed to designate a portion connecting two different scenes. Also, the "frame" is defined as a still image of a minimum unit of elements constituting the video data. According to this method, when the length of a scene is shorter than a predetermined time length, selection is possible except for the particular scene. This method permits a frame of the browsing image to be selected and used as browsing data for each scene.

The data for browsing created or input by an application program in an information processing system will hereinafter be referred to as media data or application-specific data (ASD), and the compressed (scaled-down) bit-map image used for retrieving the media data will be referred to as retrieval or browsing data. The browsing data is assumed to include at least one scaled-down bit-map image. Also, the operation of displaying on the screen the browsing data scaled down from a bit-map image of the data as a list or displaying a plurality of browsing data sequentially in the same area on the screen will be referred to as browsing.

The above-mentioned means for displaying a list of the contents of data in textual form can at most display the file name, the name of the entity that has created the file, date and time, etc. It is difficult to supply a sufficient amount of information for the user to grasp the contents of the media data. As a result, it becomes necessary for the user to store the correspondence between the file name, etc. and the contents of the media data. As an alternative, the application program that has created the particular media data must be newly invoked in order to confirm the contents.

The means for displaying a list of icons described above poses a similar problem to the means for displaying a list of texts. For icons, however, the use of a dedicated editor or the like permits creation of independent icons for each data, although special effort is required each time data is created.

The method using a keyword or the like, on the other hand, is such that the entered keyword does not necessarily match the keyword used for retrieval. Also, new invocation of an application program is required if the contents are to be confirmed.

The information processing system described in the Cross-Reference can solve the problem points described above. Since such an information processing system cannot handle audio data having no visible information like the bit-map image, however, a different interface must be realized and used when handling nonvisible data.

For media data to be retrieved from the browsing data, it is necessary to associate the file names of the two data with each other. In the method described in the Cross-Reference, the user is required to input the file name of the media data for the purpose of association. Also, when application data are newly created, modified or deleted, the user is required to enter, re-enter or delete the browsing data. Further, even a user who is not permitted to access the media data file is capable of referencing the contents of the browsing data file.

According to JP-A-3-292572, when the video data has a number of scenes, the number of bit-map images correspondingly increases, thus requiring a long time for retrieval. In other words, it is not sufficient only to use the frames with scene changes as a bit-map image for retrieval.

SUMMARY OF THE INVENTION

An object of the present invention is to provide an information processing system in which browsing data is supplied even for audio data or the like having no visible information, in which all types of media data can be retrieved rapidly and readily with a uniform interface, and also in which media data such as audio data, which so far could only be retrieved sequentially by the conventional means, are presented to the user in parallel making possible rapid retrieval of the media data.

A second object of the invention is to provide an information processing system in which the browsing data is created automatically without modifying the application program which has no function for creating browsing data and the browsing data is associated with the media data automatically without user operation. Also, the invention is intended to provide an information system in which any modification of media data (update, new creation or deletion) is automatically detected and the browsing data is automatically updated accordingly. Further, the invention is intended to allow only the user permitted to reference the media data to access the browsing data.

A third object of the invention is to provide an information processing system in which, when the media data is video data, the browsing data is created by selecting a plurality of frames of a browsing bit-map image for each of crucial scenes. For trivial scenes, on the other hand, the number of bit-map images for browsing is reduced without selecting any browsing bit-map images from the scenes.

In order to achieve the above-mentioned objects, according to one aspect of the present invention, there is provided an information processing system comprising processing means for creating, inputting, reproducing, editing and storing data based on an application program; output means including a display unit commonly used by a plurality of processing means; means for creating browsing data from the data output from the processing means to a plurality of means including the display unit; means for associating the data created by the processing means (application-specific data) with the browsing data; means for browsing the browsing data; means for activating the processing means corresponding to designated browsing data; and means for storing the program and data required by each means. The information processing system further comprises means for converting nonvisible data into visible data including means for creating a bit-map image from nonvisible data; means for converting visible data into browsing data by scaling down the bit-map image and using the scaled-down bit-map image as browsing data; and means for displaying identifiers simultaneously with a list of browsing data in order to identify the data type.

According to another aspect of the invention, there is provided an information processing system comprising means for creating a bit-map image of each page of media data from code information and using the bit-map image as browsing data when the media data is configured as a graphic command or text or the like code information.

According to still another aspect of the invention, there is provided an information processing system comprising memory means for storing the date and time of creating and updating the media data and the browsing data, and decision means for referencing the date and time of creation and update stored in the memory means and deciding whether the browsing data corresponding to the media data was created earlier than the update of the media data, wherein when the decision means decides that the browsing data corresponding to the media data is created earlier than the update of the media data, the browsing data can be created based on the date and time of updating the media data automatically from the browsing data creation means. The information processing system may further comprise means for storing information as to whether the media data can be accessed for each data, decision means for deciding whether the user can reference the media data on the basis of the information stored in the memory means, and means allowing only the user capable of referencing the media data to reference the browsing data corresponding to the media data. The information processing system according to the invention may further comprise decision means for deciding whether there exist media data corresponding to browsing data and means for deleting browsing data automatically upon a decision by the decision means that no corresponding media data exists. The information processing system according to the invention may further comprise means for creating browsing data at a timing of receiving a command for displaying the browsing data. The information processing system according to the invention may further comprise means for detecting at least one of the events including creation, update, deletion, copying and translation of media data, wherein the browsing data can be created or deleted when detecting the event.

According to a yet another aspect of the invention, there is provided an information processing system wherein media data are AV data including audio data and video data having a plurality of sequential image frames, the system comprising scene change point (SCP) detection means for detecting the frames making up each scene based on the contents of the video data, volume detection means for detecting the volume of the audio data for each corresponding frame, and means for selecting as browsing data at least a frame for which the volume of more than a predetermined value is detected by the volume detection means as browsing data for the particular scene.

According to yet a further aspect of the invention, there is provided an information processing system comprising browsing data selection means for selecting at least a frame, as browsing data for the particular scene, of which the volume change with respect to another frame spaced a predetermined interval is at least a predetermined value on the basis of the per-frame volume detected by the volume detection means.

In operation, first, the media data lacking visible information, such as voices, can be browsed, thereby making it possible to handle all of a wide variety of media data. Also, the browsing using a compressed bit-map image independent of data type is possible, and therefore the media data of all types can be retrieved with a uniform interface.

Secondly, a bit-map image is generated from a video image of a location or conditions taken by video camera or the like for acquisition of data on an object of retrieval, which bit-map image is scaled down to create the browsing data. In this way, browsing data more faithful to the contents can be created thereby permitting rapid and accurate retrieval.

Further, audio data or the like is normally required to be searched one by one. A parallel search is possible by browsing the scaled-down data as browsing data permitting association of the data contents.

Also, the identifier of the media data type is displayed simultaneously with the browsing data, whereby the media data type corresponding to the particular browsing data can be notified to the user.

A bit-map image of each page of the media data is created as retrieval data from the code information for printing the media data. The identifier indicating this browsing data and the identifier indicating the media data are associated with each other and stored. After that, the browsing data is displayed. The user can search the media data stored in association by designating the browsing data on display. As a result, the browsing data can be automatically created without modifying the application program lacking the function of creating the browsing data, and can be associated with the media data automatically without user operation.

In addition, the date and time of creation and update of the media data and the browsing data are stored, and decision is made as to whether the browsing data corresponding to the media data is created before the update of the corresponding media data with reference to the date and time of creation and update thus stored. When it is decided that the browsing data is created before update of the corresponding media data, browsing data corresponding to the media data is automatically created. Consequently, the browsing data can be assumed to have been created after the updating of the corresponding media data.

Furthermore, information as to whether the media data can be accessed is stored for each data, and a decision is made as to whether the user can access the media data on the basis of the particular information. Only the user who has been decided to have the right of referencing or accessing the media data is allowed to access the browsing data corresponding to the media data. In this way, only the user permitted to access the media data can access the browsing data.

Also, a decision is made as to whether there exists media data corresponding to the browsing data. When it is decided that there exists no media data corresponding to the browsing data, the particular browsing data is automatically deleted. As a result, all of the browsing data lacking corresponding data can be deleted automatically.

Further, browsing data can be created at a timing designated for display of the browsing data. In addition, such events as creation, updating, copying and translation of the media data are detected, so that the browsing data are created or deleted at the time of such detection. In this way, a change in media data can be automatically detected, and the browsing data can be automatically updated.

Further, a plurality of browsing data corresponding to a plurality of media data respectively can be displayed on the same screen of the display means. Furthermore, a plurality of images for the browsing data corresponding to the same media data can be displayed on the same screen of the display means.

The data having both video data representing a video and audio data representing the corresponding voice is called AV data. With AV data, the portion where a scene change point occurs and the volume of each frame are detected. The required frames are selected from the AV data based on the detected data, and are used to create and display the browsing data.

The AV data normally includes a plurality of scenes, each of which has different degrees of importance according to the playback time. The browsing data thus are selected according to the playback time of each scene as described below. Scenes with a short playback time are determined basically to have no significance and are not selected. As to a scene having an average volume (av) of more than a predetermined value, however, it is assumed to have some significance, and browsing data are selected for the entire scene.

For a scene having a long playback time, on the other hand, one characteristic part (CP) is selected by deciding that it has some significance. When it is desired to avoid the case of selecting only one characteristic part from a very long scene, however, it is assumed that a plurality of characteristic parts can be selected according to the designation of the searcher. In such a case, it is also assumed that one of the following two functions can be selected.

(1) All of the scenes having a predetermined volume or more are selected when selection of a plurality of characteristic parts is desired.

(2) A portion representing the maximum volume (MV) in a scene is selected when selection of only one characteristic part is desired.

A scene having a playback time of intermediate length having an average volume of more than a predetermined value is assumed to have some significance and a portion thereof representing the maximum volume in the scene is selected. A scene having a portion with a volume change of more than a predetermined volume difference (VD), though, even when it has an average volume of less than a predetermined value, is considered to have some significance so that a portion representing the maximum volume change in the scene is selected. The remaining scenes are considered to have no significance and are not selected.

The AV data is comprised of a plurality of frames, each of which has a volume of predetermined magnitude. When examining the volume change in a scene, the volume of a given frame must be compared with that of a different frame. The following procedure is taken for examining the volume change in a scene.

First, when examining the volume change, if the immediately preceding frame is used as an object for detecting a difference, the part with the maximum volume difference (MVD) may not be accurately determined due to the effect of noises. Thus, an arrangement is made for allowing the searcher to set the number of immediately preceding frames by which to retroact to a given frame for comparison with the current frame to detect the volume difference.

Further, detection of a portion with the maximum volume difference is divided into two cases, one where it is desired to detect a portion with the maximum volume increase and the other where it is desired to detect a portion with the maximum volume change, i.e., the maximum absolute value of volume difference. Selection of one of these two options is left to the searcher.

Also, the browsing data is constituted by coupling a plurality of characteristic scenes. When an excessive amount of browsing data are created and acquired, however, the searcher is burdened with an increasing number of images requiring reference, resulting in a longer time required for retrieval. In order to prevent the browsing data from being selected in an excessive amount, therefore, the following measure is taken.

To allow the searcher to determine the number of frames making up each scene selected by the browsing data, an arrangement is made for enabling the searcher to set the number of frames preceding or succeeding to a characteristic part in a scene at the time of selection.

When the browsing data is excessive in amount, the number of images requiring referencing by the searcher correspondingly increases, leading to an increased time required for retrieval. For reducing an excessively large amount of browsing data, the following procedure is taken.

First, arrangement is made for enabling the searcher to set the maximum allowable number of scenes (MANS) acceptable as browsing data. When the number of scenes included in the browsing data is larger than the set number of scenes, the number of scenes included in the browsing data is reduced below the set number of scenes. In this case, an arrangement is made for allowing the searcher to determine which is deleted first, the scene with the minimum value of the maximum volume or the scene with the minimum volume difference.

Also, an arrangement is made for allowing the searcher to set the maximum total allowable number of frames (MANF) acceptable as browsing data. When the total number of frames included in the browsing data is larger than the set number of frames, the number of frames included in the browsing data is reduced below the set number of frames.

With the function of reducing the number of frames included in the browsing data below the set number of frames, the contents of the browsing data may become difficult to understand at the time of browsing if the browsing data is reduced excessively. In order to avoid this inconvenience, the searcher is allowed to set the number of minimum required frames (MRNF) for each scene to thereby prevent the number of per-scene frames from being reduced to such a degree as to make the contents difficult to understand.

BRIEF DESCRIPTION OF THE DRAWINGS

FIGS. 8A, 8B, 8C are diagrams showing the steps of processing the browsing data for entry thereof.

FIG. 9 shows a search dialog box.

FIG. 18 shows a file attribute management table.

FIG. 28 shows a scene characteristic table.

FIG. 29 shows a selection table for storing the characteristic parts of AV data.

DESCRIPTION OF THE PREFERRED EMBODIMENTS

A first embodiment of the invention will be described below with reference to the drawings.

Figure 1:
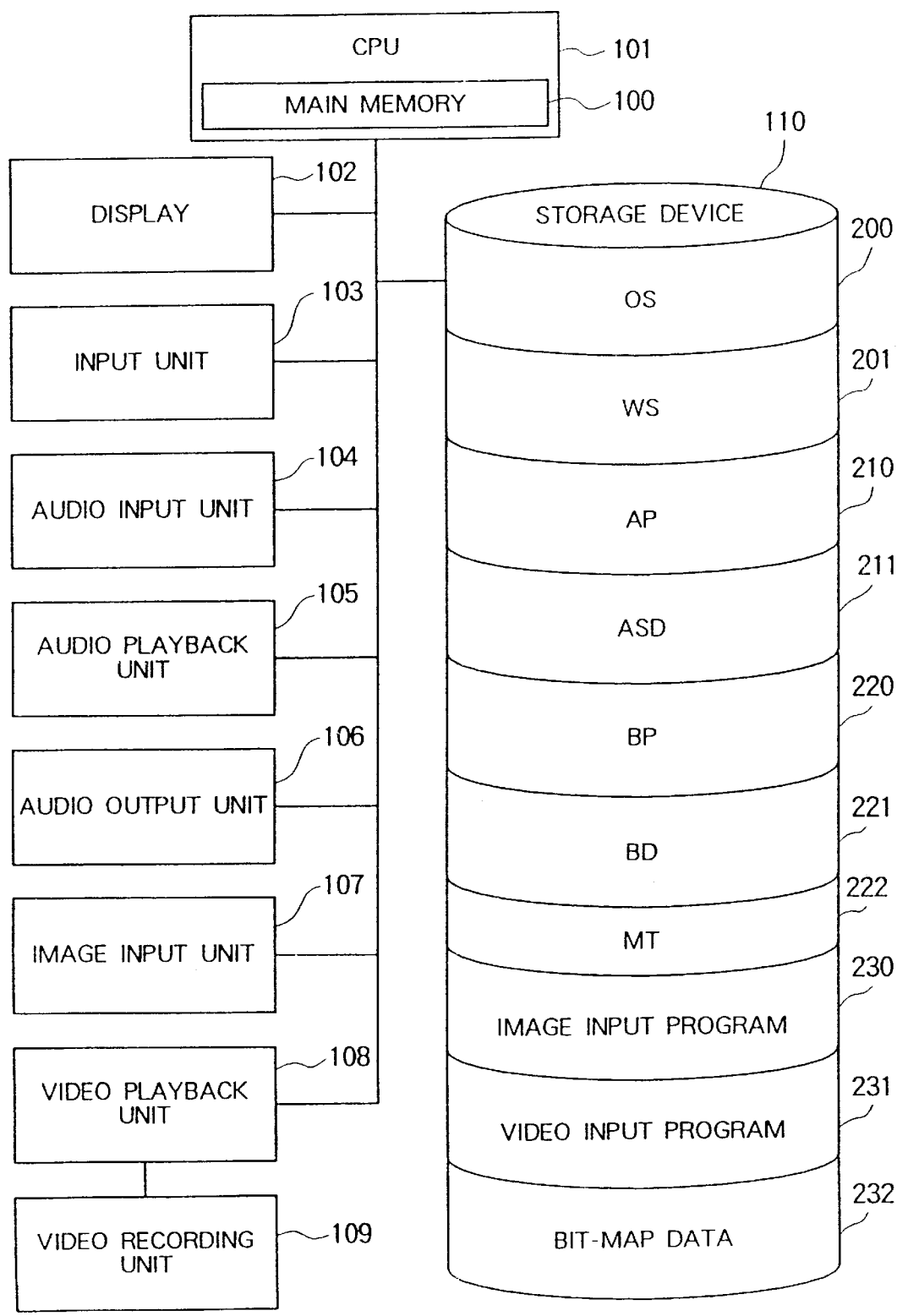
FIG. 1 is a diagram schematically showing the configuration of an information processing system according to the present invention.

A hardware configuration for embodying the invention is shown in FIG. 1. Reference numeral 100 designates a main memory for storing a program and data, numeral 101 a central processing unit (CPU) for fetching and executing the program and data from the main memory, numeral 102 a display unit such as a bit-map display, numeral 103 an input unit such as a mouse or a keyboard, numeral 104 an audio input unit such as a microphone, numeral 105 an audio playback unit such as a compact disc, numeral 106 an audio output unit such as a speaker, numeral 107 an image input unit such as an image scanner, numeral 108 a video reproduction unit for reproducing and displaying a video image on the display unit 102, numeral 109 a video recording unit for recording a video image to be reproduced in the video reproduction unit 108, and numeral 110 a storage device for storing files. The storage device 110 has stored therein an operating system (OS) 200, a window system (WS) 201, an application program (AP) 210, application-specific data (ASD) 211, a browsing program (BP) 220, browsing data (BD) 221, a management table (MT) 222, an image input program 230, a video input program 231 and bit-map data 232.

Figure 2:
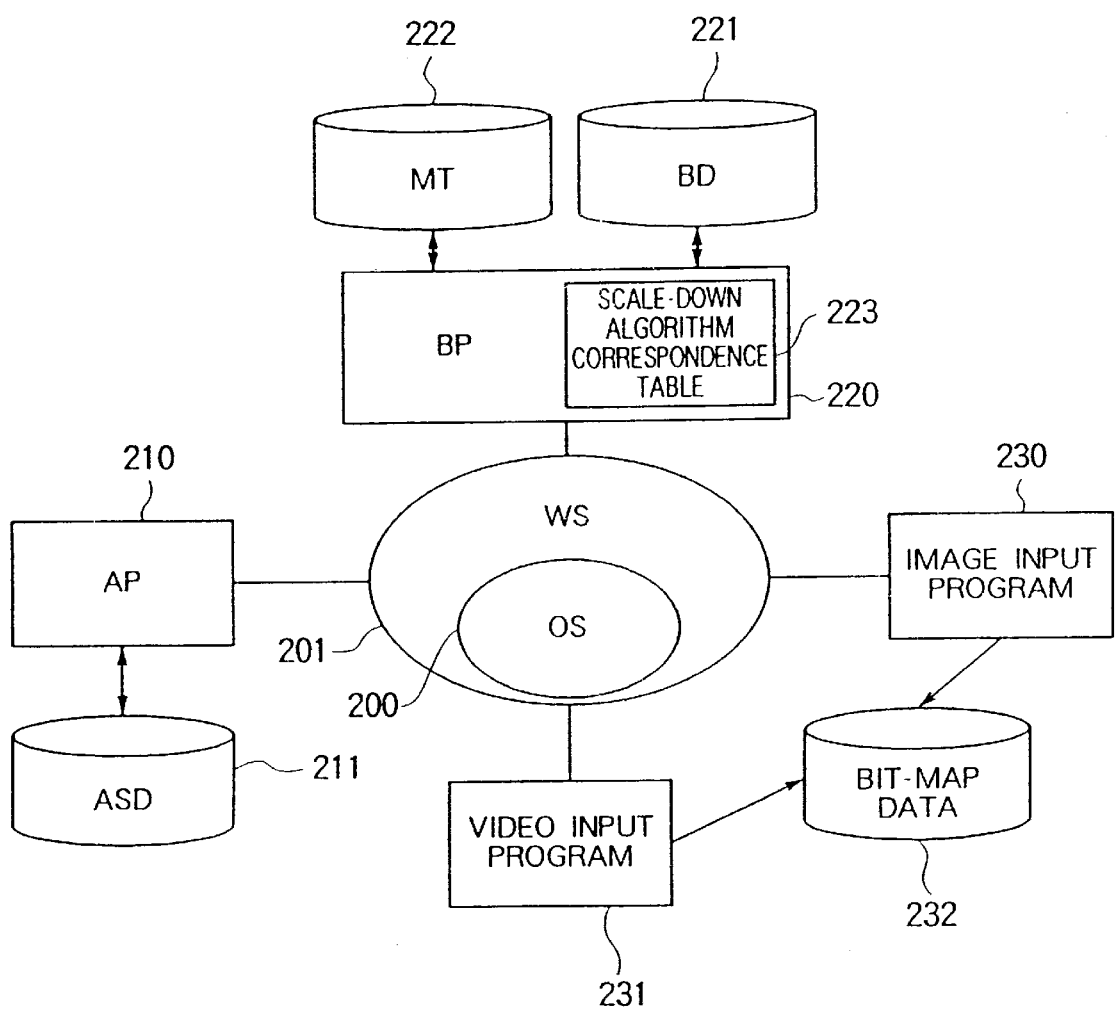
FIG. 2 is a diagram showing the software structure stored in a storage device.

A software structure for embodying the invention is shown in FIG. 2. Each program and data are appropriately read into the main memory 100 from the storage device 110, and executed in the central processing unit 101.

Numeral 200 designates the operating system for controlling the program execution, numeral 201 the window system for managing the input and output by way of a window; numeral 210 the application program for editing, reproducing and displaying the media data such as texts, graphics, images, videos and voices; numeral 211 the application-specific data providing an object of execution for the application program 210; numeral 220 a browsing program for managing the association between the application-specific data 211 and the browsing data 221; scaled-down display and display of a list of the browsing data and creation and entry of the browsing data; numeral 221 the browsing data displayed by the program 220; numeral 222 a management table for managing the association between the application-specific data 211 and the browsing data 221; numeral 230 an image input program for controlling the image input unit 107; reading an image and outputting a bit-map data 232; numeral 231 a video input program for controlling the video reproduction unit 108, reading the video and outputting the bit-map data 232; and numeral 232 bit-map data output from the image input program 230 or the video input program 231 and read by the browsing program 220. The browsing program 220 has a correspondence table 223 (FIG. 3) for checking the correspondence between the data type and the image scale-down algorithm for creating the browsing data.

Figure 3:
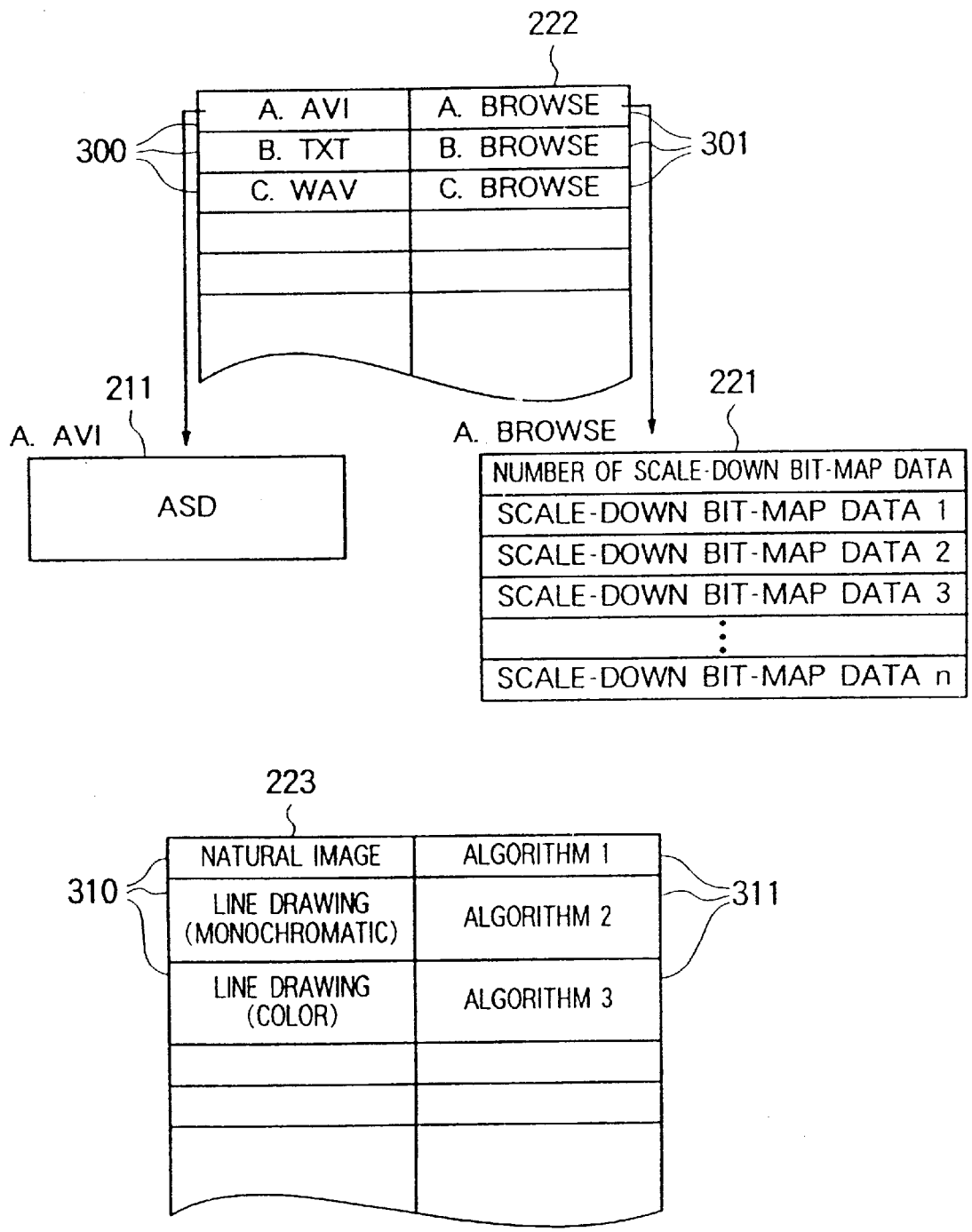
FIG. 3 shows the data format of the browsing data and the management table (MT).

A data format of the management table 222 and the scale-down algorithm correspondence table 223 is shown in FIG. 3.

First, the management table 222 includes a data name 300 of the application-specific data 211 and a data name 301 of the browsing data 211. The browsing data 211 includes a plurality of scale-down bit-map data and the number thereof. The scale-down bit-map data is generated by scaling down the bit-map data read by the browsing program 220 from the window system 201, reading and converting the application-specific data or reading and scaling down the bit-map data 232 from the storage device 110.

Next, the scale-down algorithm correspondence table 223 includes the bit-map data type 310 providing the source of the browsing data 211 and a scale-down algorithm name 311 suited for the particular bit-map data. This is in view of the fact that the optimum scale-down algorithm varies with the bit-map type, and the data type of the browsing data is automatically determined and selected from this table by the browsing program 220 at the time of entry of the browsing data. The algorithm for determining the data type is described in the reference U.S. Ser. No. 08/271,923 filed on Jul. 7, 1994 cited as the Cross-Reference.

For allowing the browsing program 220 to browse the file of each media data including the audio information, the work of creation and entry of the browsing data 221 is required. Related embodiments will be explained with reference to FIGS. 4 to 7.

Figure 4:
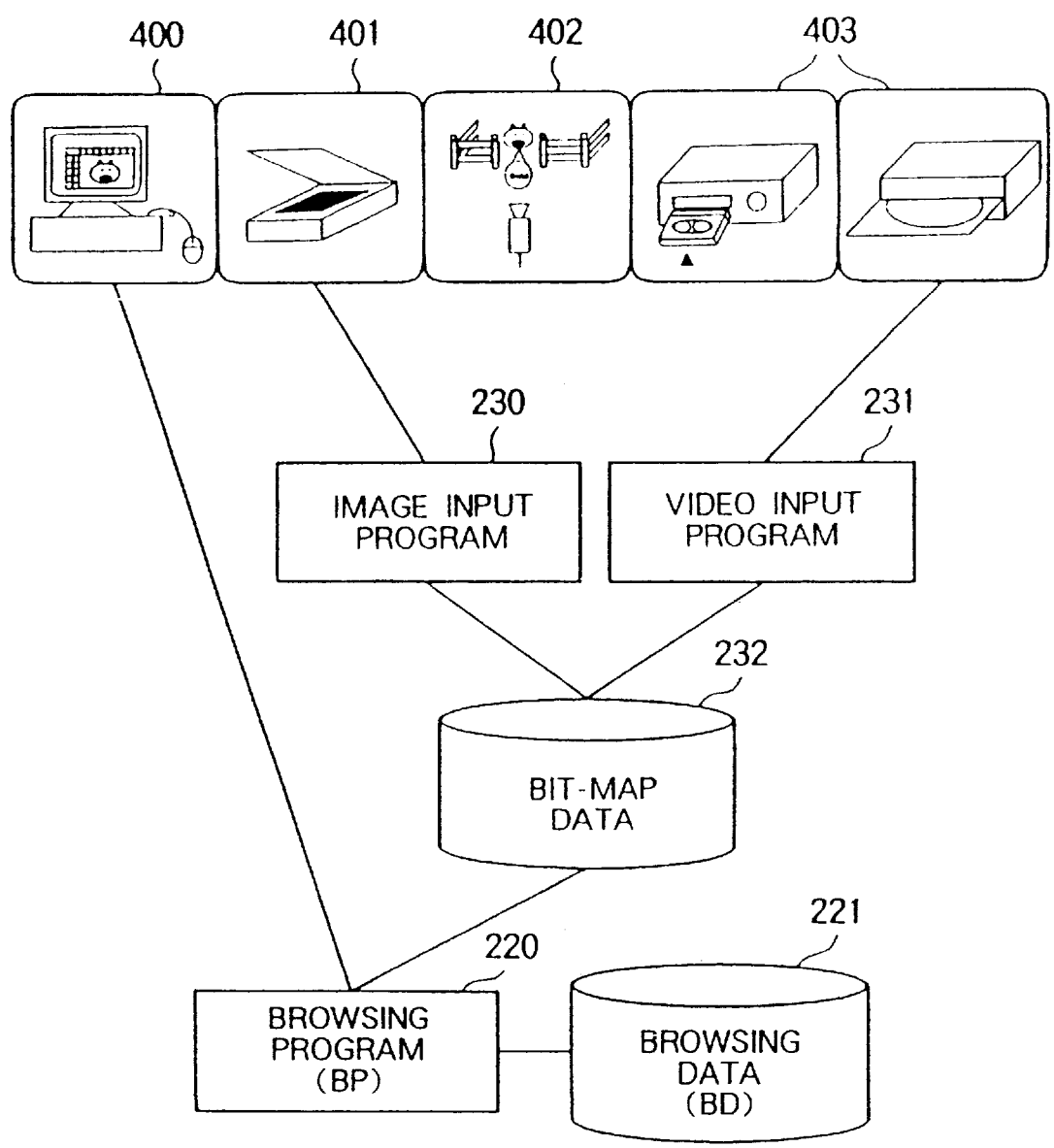
FIG. 4 shows the process of creating the browsing data.

FIG. 4 shows the process for creating the browsing data 221. For the browsing program 220 to create the browsing data 221, there are two means available depending on how the bit-map data involved is acquired. The user may use either of them for creating the browsing data.

The first means is to acquire the bit-map data existing in a window opened by other applications through the window system 201. In this case, the bit-map data is required to be prepared in advance by the application for editing the graphics (400).

The second means is for reading the bit-map data 232 existing as a file and using the whole or part thereof as browsing data. In this case, first, a new window is prepared, in which the bit-map data read is developed and displayed, so that the bit-map data is acquired through the window system 201 in a manner similar to the first means.

The means for creating the bit-map data 232 include means for creating an image (still image) and means for creating the bit-map data 232 from a video image. The still image and the video image are both represented by digital data with the format thereof expressed generally in JPEG or MPEG.

First, when the bit-map data 232 is generated from a still image, the image input program 230 is used to read a video image from the video image reproduction unit 108 (403) and output one of the frames as a bit-map data. When an audio media data is involved, on the other hand, the video image recording unit 109 is used to record the location and conditions of audio recording simultaneously (402), which video image is used for generating the browsing data. Alternatively, an illustration or photograph causing association of the audio information may be used.

Figure 5:
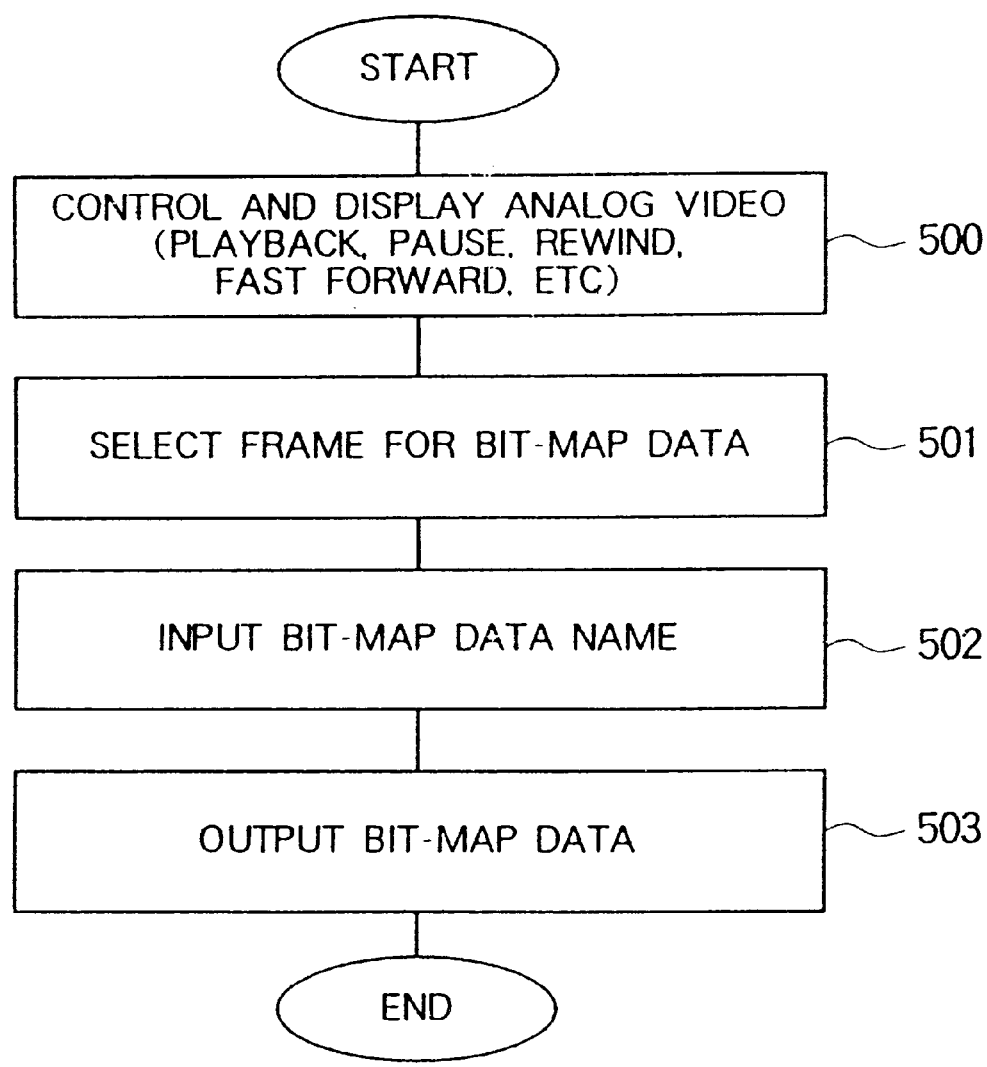
FIG. 5 shows the steps of processing a video input program.

Now, explanation will be given for the steps of processing the video image input program 231 with reference to FIG. 5.

First, the operator controls the video image reproduction unit 108 to perform the reproduction of the video image, temporary stop (pause), rewind or fast forward feed operation. Also, the related image is displayed on the display unit 102 (step 500). Then, the operator selects one of the frames to be output as bit-map data (step 501), inputs the name of the bit-map data to be output (step 502), and the input program (231) outputs the selected frame to the storage device 110 as bit-map data (step 503).

Figure 6:
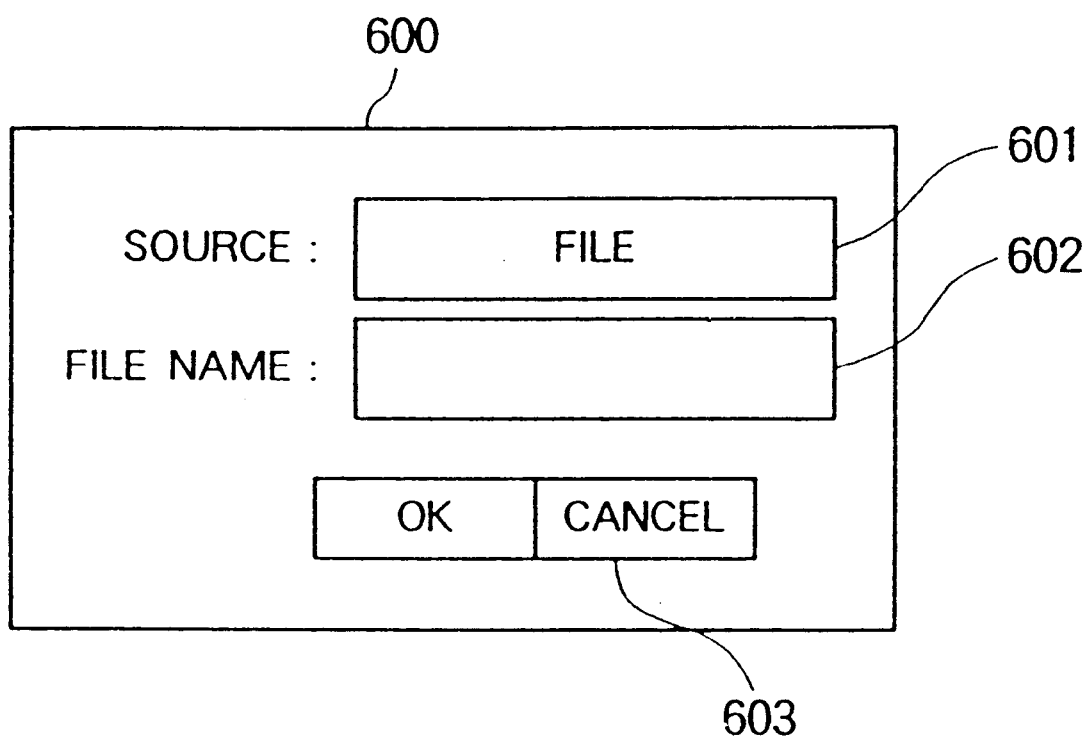
FIG. 6 shows a dialog box for selecting the source of bit-map data.

FIG. 6 shows the dialog box (600) used for selecting the source of the bit-map data used for creating the browsing data at the time of entering the browsing data. The source select button (601) is a switch for selecting from which the bit-map data is to be acquired, the window of other applications or the bit-map data 231 providing a file. Numeral 602 designates a file name input section for inputting the name of a file from which the bit-map data is to be acquired. Numeral 603 designates a command input section including an OK button and a CANCEL button. When the file input is selected on this dialog box at the time of entry of the browsing data, the designated file is read and the related bit-map data is developed and displayed on a newly-generated window.

Figure 7:
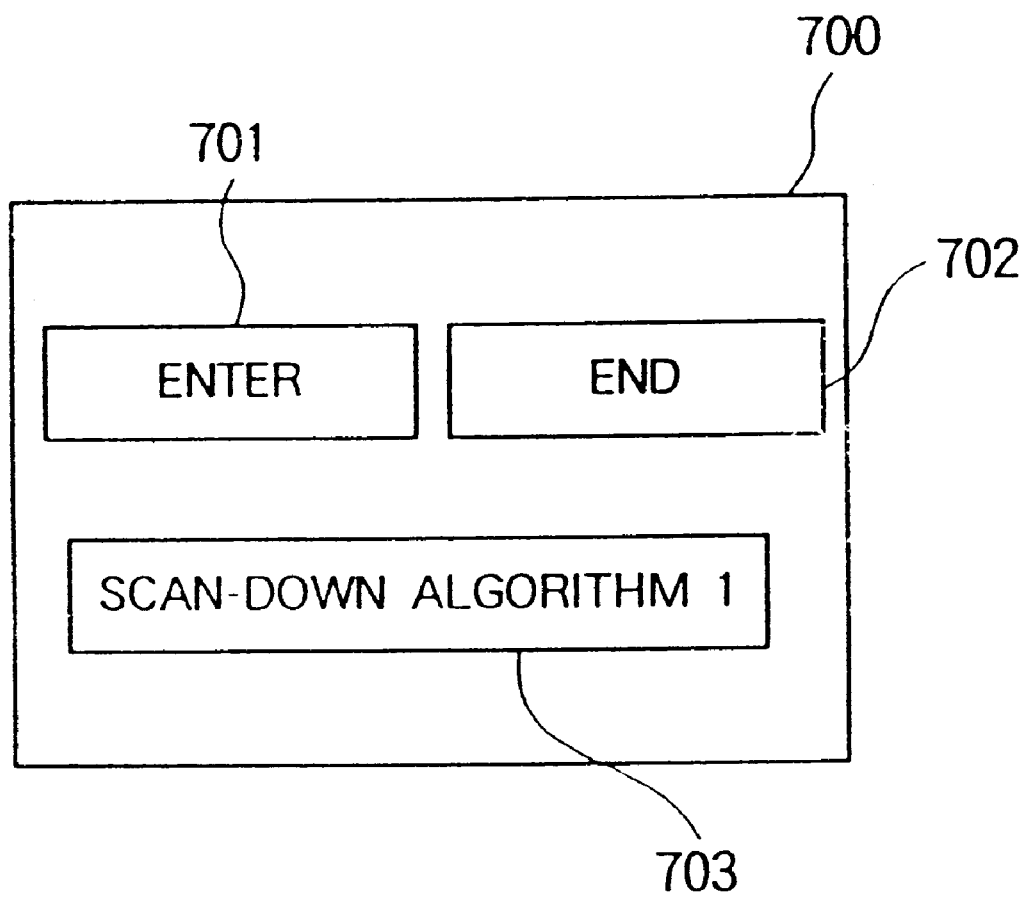
FIG. 7 shows the dialog box for entering the browsing data.
Figure 30:
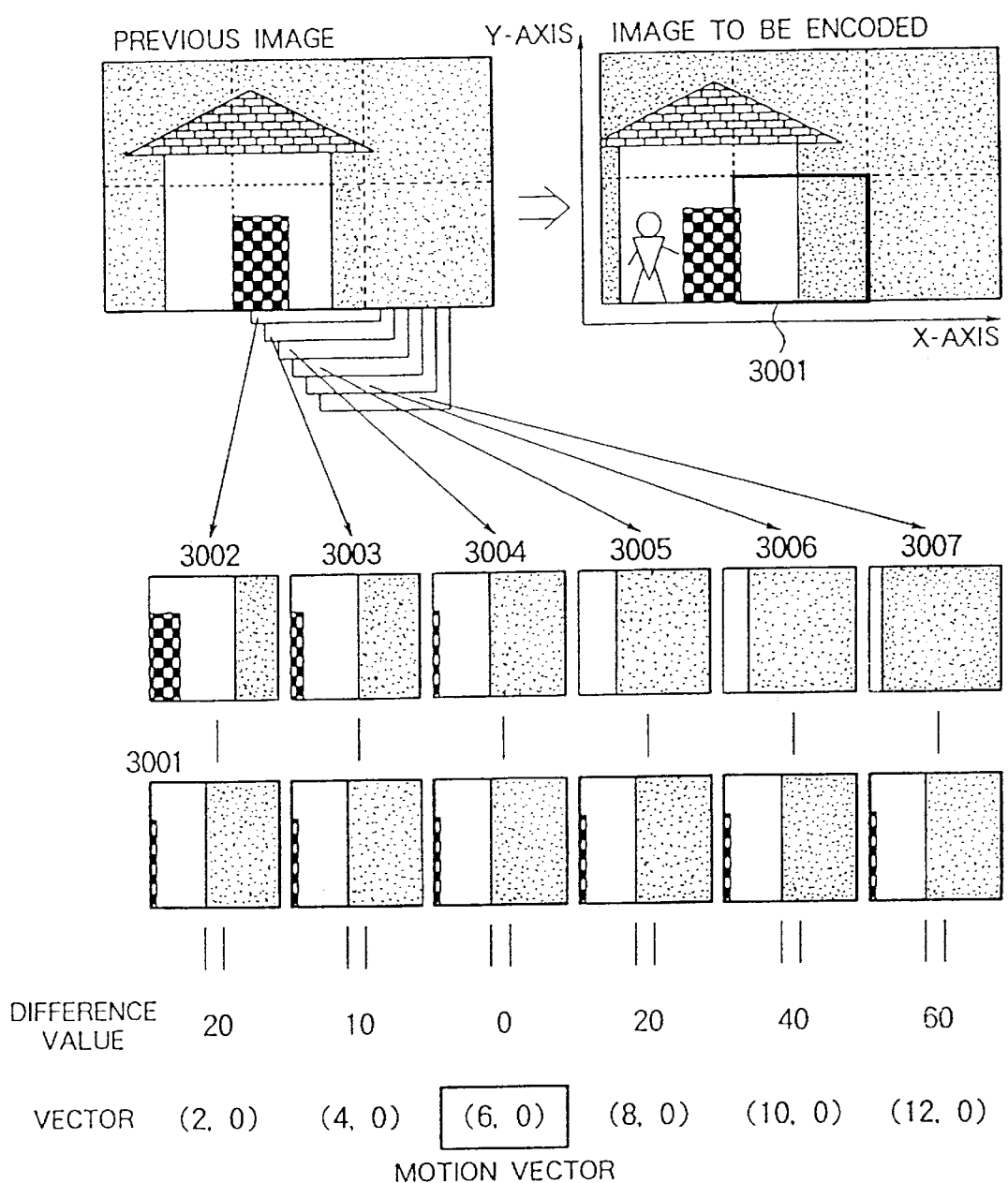
FIG. 30 is a diagram for explaining a block matching scheme.

A dialog box (700) used for entering the browsing data is shown in FIG. 7. A scale-down algorithm setting button (703) is such that by clicking this button, a pop-up menu appears allowing the operator to select the appropriate scale-down algorithm. When the operator designates nothing, the scale-down algorithm correspondence table 223 shown in FIG. 30 is depended upon. Numeral 701 designates a button for entering the browsing data. By clicking this button, the bit-map data begins to be scaled down or entered. Numeral 702 designates an entry completion button. When this button is clicked, the entered bit-map data is stored in a file as the browsing data 221 (FIG. 3).

Figure 8A:
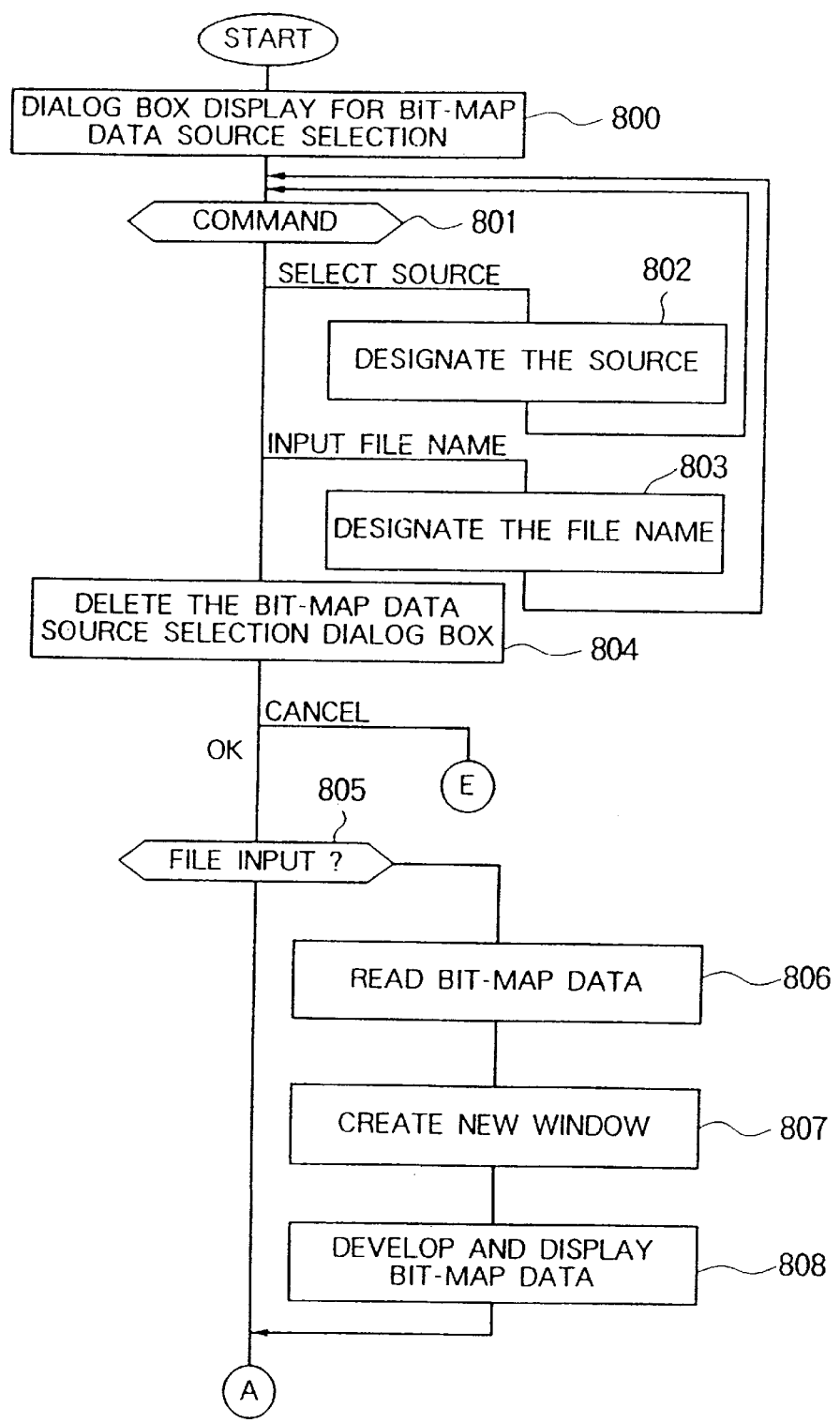
Figure 8B:
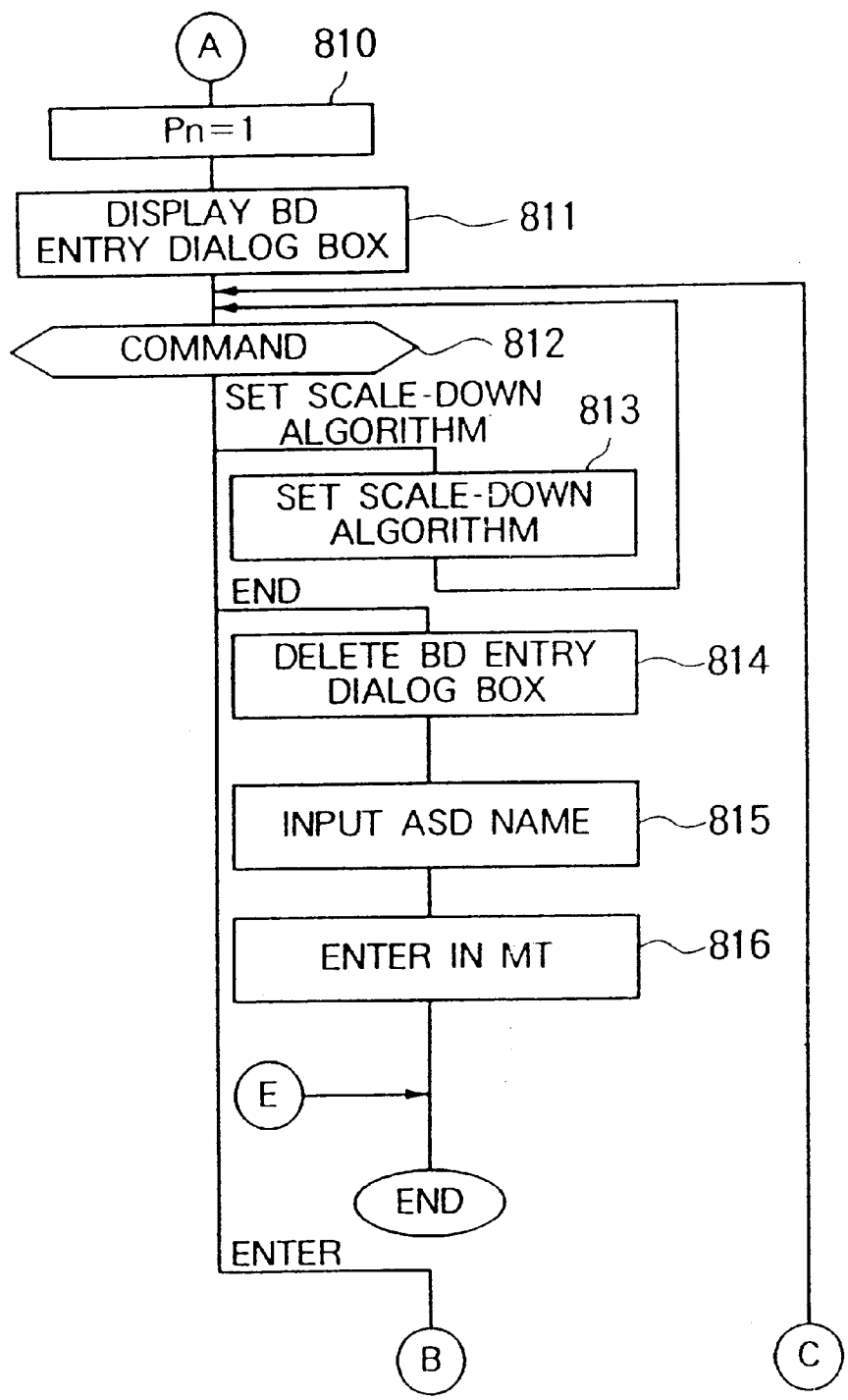

The steps of processing the entry the browsing data will be explained with reference to FIGS. 8A, 8B, 8C.

First, steps 800 to 804 select from which bit-map the browsing data is to be created.

Specifically, a bit-map data source select dialog box shown in FIG. 6 is displayed to allow the user to select the source of the bit-map data providing the source of browsing data from the window displayed by other applications or from the bit map stored in a file (step 800). Upon clicking of the button by the operator, the process branches (step 801) to thereby designate a bit-map source (step 802) and designate the file name of the bit-map data 232 (step 803). When the OK button or the CANCEL button is depressed, the bit-map data source select dialog box is deleted to thereby terminate the source selection (step 804).

Steps 806 to 808 are a flow of steps performed when the user designates the bit-map data 232 in the form of a file as a bit-map data source.

First, when a file is selected as a bit-map data to be read by the user, the process branches to the step of reading a file (step 805). The process reads the designated bit-map data 232 into the main memory 100 (806), creates a window for displaying the bit-map data 232 read at step 806 (step 807), and develops and displays the bit-map data 232 read at the window created at step 807 (step 808).

Steps 810 to 826 are for actually creating and entering the browsing data.

First, a variable Pn is prepared for counting the number of entered pages and the value of the variable is initialized to 1 (step 810). The browsing data entry dialog box shown in FIG. 7 is displayed (step 811), and the process is caused to branch by the button designated by the user (step 812).

Step 813 is performed when the scale-down algorithm is changed by the user by way of the "scaled-down algorithm setting button". In other words, the scale-down algorithm used for creating the browsing data is set to the algorithm designated by the user.

Steps 814 to 816 are for terminating the entry of the browsing data when the user designates the END button.

First, the browsing data entry dialog box is deleted (step 814), and the user is caused to input the name of the application-specific data corresponding to the browsing data created (step 815). The name of the browsing data thus created and the name of the corresponding application-specific data are entered in the management table 222 shown in FIG. 3 (step 816).

Steps 820 to 826 generate the browsing data from the bit-map data in the region designated by the user with mouse when the user designates the ENTRY button. First, in order to cause the user to designate the region of the bit-map data associated with the browsing data, the mouse input is set in ready state (step 820, region input mode). Then, the bit-map data for the region designated by the user with mouse is read (step 821), and the region input mode is released (step 822). The bit-map data read at step 821 is scaled down and the browsing data created (step 823). According to the type of the application-specific data corresponding to the particular browsing data, an identifier is pasted on the browsing data created at step 823 (step 824). The type of the application-specific data can be distinguished from the data name. For example, the text data name is given as xxx.TxT, and the video data name xxx.AVI. The browsing data created at steps 823 and 824 are entered as the Pn-th data (step 825), and the variable Pn for counting the page number is incremented (step 826).

By executing steps 800 to 826 described above, the browsing data 221 can be created from the bit-data map displayed by the application or from the bit-map data 232 in the form of a file.

FIG. 9 shows a search dialog box 900 displayed when an intended file is searched by the user. The search dialog box 900 includes a condition input section 901, a command input section 902 and an icon list display section 903. The condition input section 901 is for inputting the conditions including the path of a file to be searched and the regular expression. The command input section 902 includes a LIST button, a NEXT button, a PREVIOUS button, a FIRST button and a LAST button for executing these commands in response to the icon selected by the user. The icon list display section 903 includes a plurality of icons, and can be scrolled as required to display all of the icons of the file meeting the condition. The icon 904 includes a scale-down bit-map data display section 905, a data name display section 906 and an identifier indicating the type of the application-specific data. The scale-down bit-map data display section 905 is for displaying a characteristic page of all of the browsing data corresponding to the application-specific data. The data name display section 906 is for displaying the file name used for storing the application-specific data. The identifier indicating the file type is displayed as a mark indicating the media type of the particular file. In FIG. 9, an audio file identification mark 90 is used as an example of such an identifier.

When the user designates an icon and clicks the LIST button on the search dialog box 900, the search dialog box 900 is displayed as a dialog box (a full scale-down bit-map data list display dialog box) showing a list of all pages of the browsing data corresponding to a file storing application-specific data.

Figure 10:
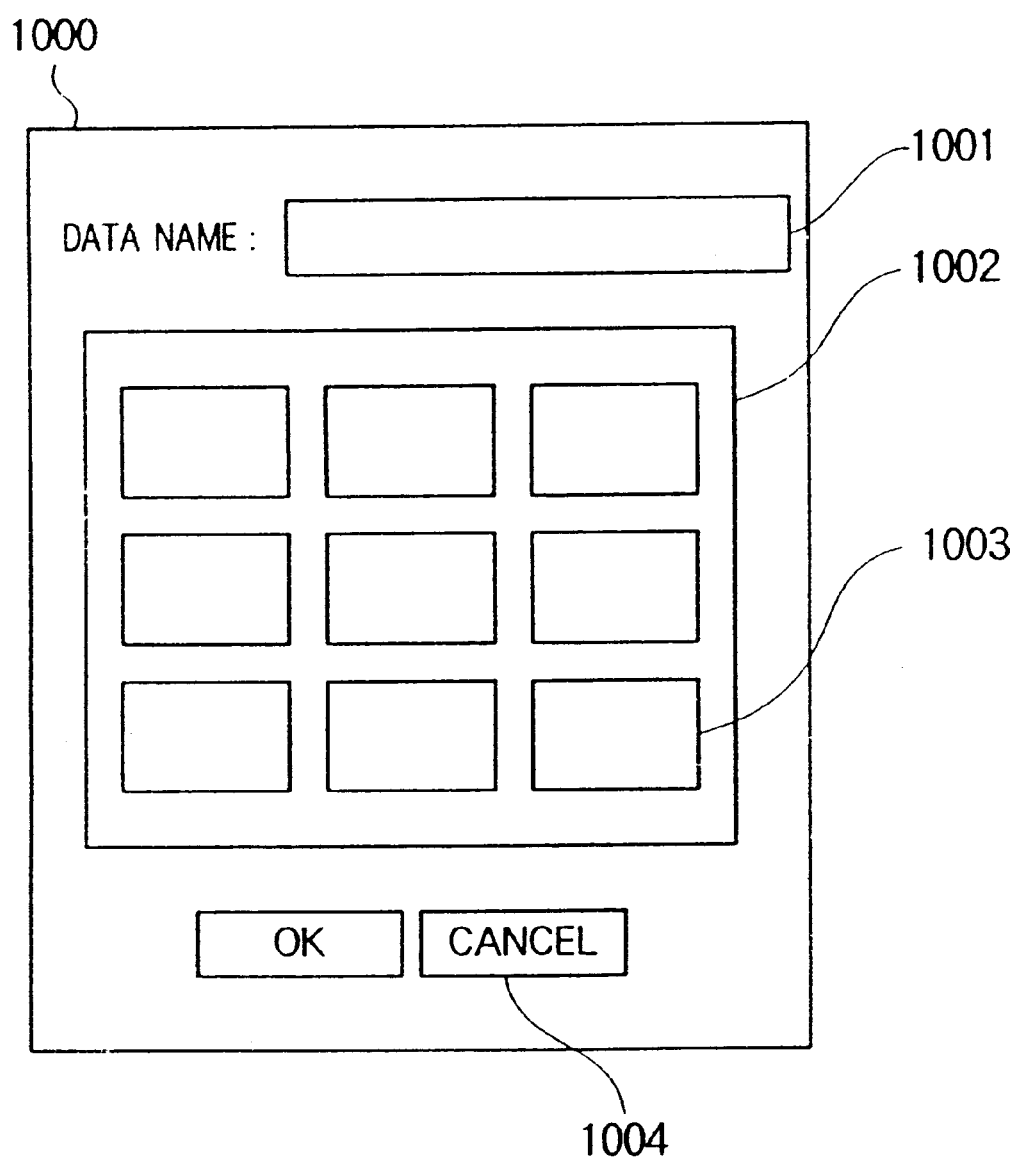
FIG. 10 is a diagram showing the dialog box displaying a list of full scaled-down bit-map data.

FIG. 10 shows a full scale-down bit-map data list display dialog box 1000. The full scale-down bit-map data list display dialog box 1000 includes a data name display section 1001, a scale-down bit-map data list display section 1002 and a command input section 1004. The data name display section 1001 is for displaying the file name of the application-specific data for list display. The scale-down bit-map data list display section 1002 includes a plurality of scale-down bit-map data display sections 1003, and can be appropriately scrolled to display all of the pages of the browsing data. The scale-down bit-map data display section 1003 is for displaying a page of the browsing data. The command input section 1004 includes an OK button and a CANCEL button.

Now, the steps of processing the display of a list of browsing data using the search screen 900 shown in FIG. 9 and the full scale-down bit-map data list display section 1000 shown in FIG. 10 will be explained with reference to FIG. 11. These steps are also performed by the browsing program 220.

According to the browsing program, when a condition is input to the condition input section (step 1111), the browsing data corresponding to the application-specific data meeting the particular condition is displayed as a list on the icon 904 as shown in FIG. 9 (step 1112), the input is accepted from the user (step 1114), and when the input is for resetting the condition (step 1115), the process is returned to step 1111. Otherwise, when the input is for selecting an icon (step 1116), the selected icon is stored (step 1117), and the process returns to step 1114. If the input is for selecting the NEXT button (step 1118), the scale-down bit map next to the bit-map on display of the browsing data is displayed on the selected icon (step 1119), with the process returning to step 1114. If the input is for selection of the PREVIOUS button (step 1120), on the other hand, the scale-down bit-map before the bit-map on display of the browsing data is displayed on the selected icon (step 1121), with the process returning to step 1114. When the input is for selecting the FIRST button (step 1122), the first scale-down bit-map of the browsing data is displayed on the selected icon (step 1123), with the process being returned to step 1114. When the input is for selecting the LAST button (step 1124), the last scale-down bit-map of the browsing data is displayed on the selected icon (step 1125), with the process being returned to step 1114. When selection of the LIST button is involved (step 1126), by contrast, a list of all the scale-down bit-maps of the corresponding browsing data is displayed on the selected icon as shown in FIG. 10 (step 1127). When the input is for selecting the OK button (step 1130), the termination process is effected (step 1131), while if the input is for selecting the CANCEL button (step 1129), the process is terminated without doing anything. When, after step 1127 a command is input on the scale-down bit-map data list display screen 1000 (step 1128), with the OK button selected (step 1129), then, the process returns to step 1131. When the CANCEL button is selected (step 1129) instead, the process is returned to step 1114. The termination process (step 1131) is defined as a process of searching the file names of the application-specific data corresponding to the icon selected at the time of selecting the OK button in order to determine a program utilizing a particular file name, and delivering the file name to the program after activation of the program if the program is not activated. The application-specific data and the program utilizing the same data are defined by the table shown in FIG. 18 (described later).

Next, step 1112 shown in FIG. 11 will be explained in detail with reference to FIG. 12.

First, step 1201 decides whether the following steps have been performed for all of the application-specific data meeting the condition, and if the response is affirmative, the process is terminated. Otherwise, the following process is repeated for the application-specific data remaining unprocessed. More specifically, in the presence of browsing data corresponding to the application-specific data (step 1202), the first scale-down bit-map of the browsing data is displayed (step 1203). The presence or absence of browsing data is determined based on the management table 222 of FIG. 3. When the application-specific data is audio data (step 1204), an audio file identification mark 907 is displayed (step 1205), and the process returns to step 1201.

Now, a second embodiment of the invention will be explained with reference to the accompanying drawings. According to this embodiment, the relationship between the application-specific data and the browsing data is automatically managed.

Figure 13:
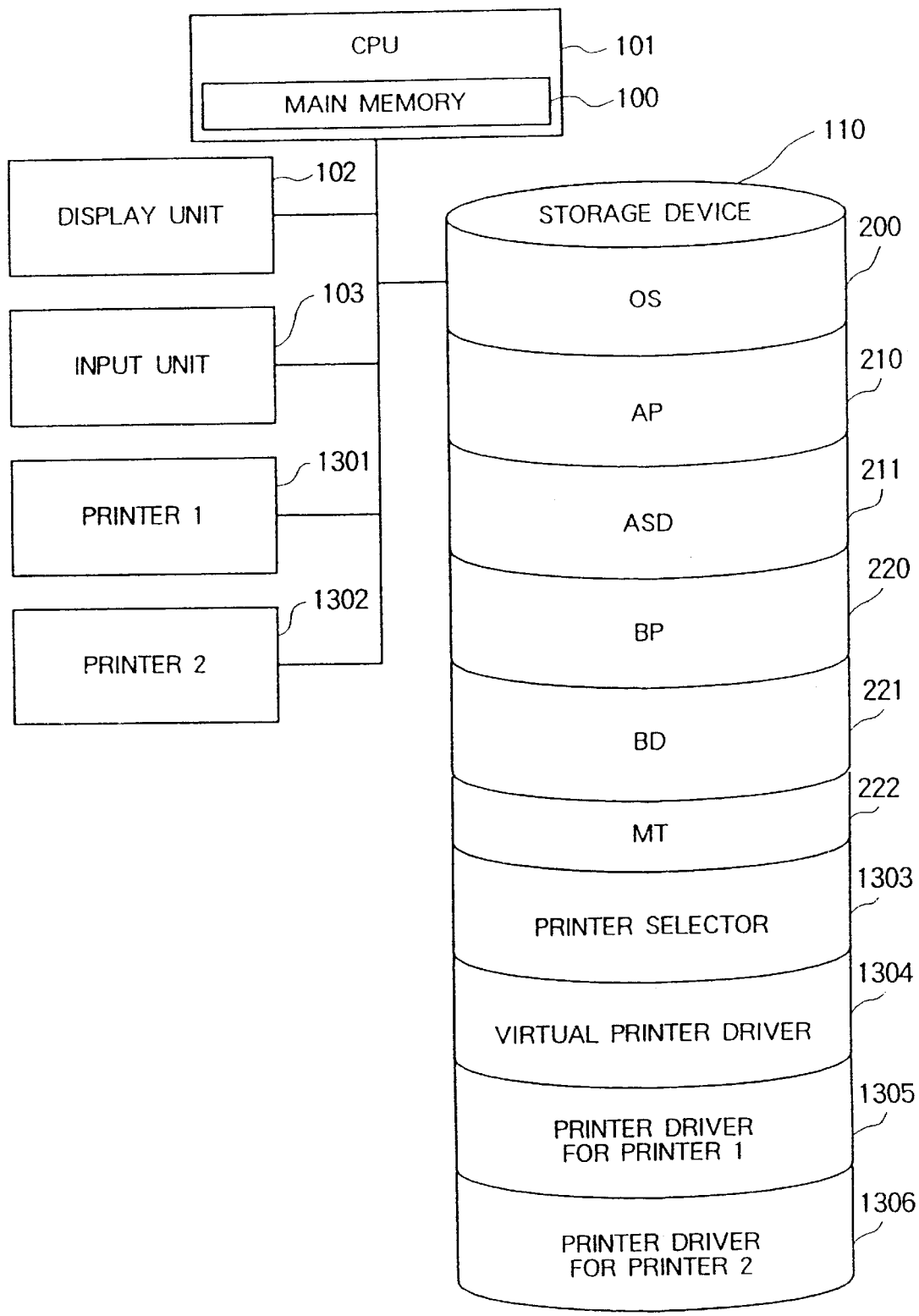
FIG. 13 shows a second example of the hardware configuration for embodying the present invention.
Figure 14:
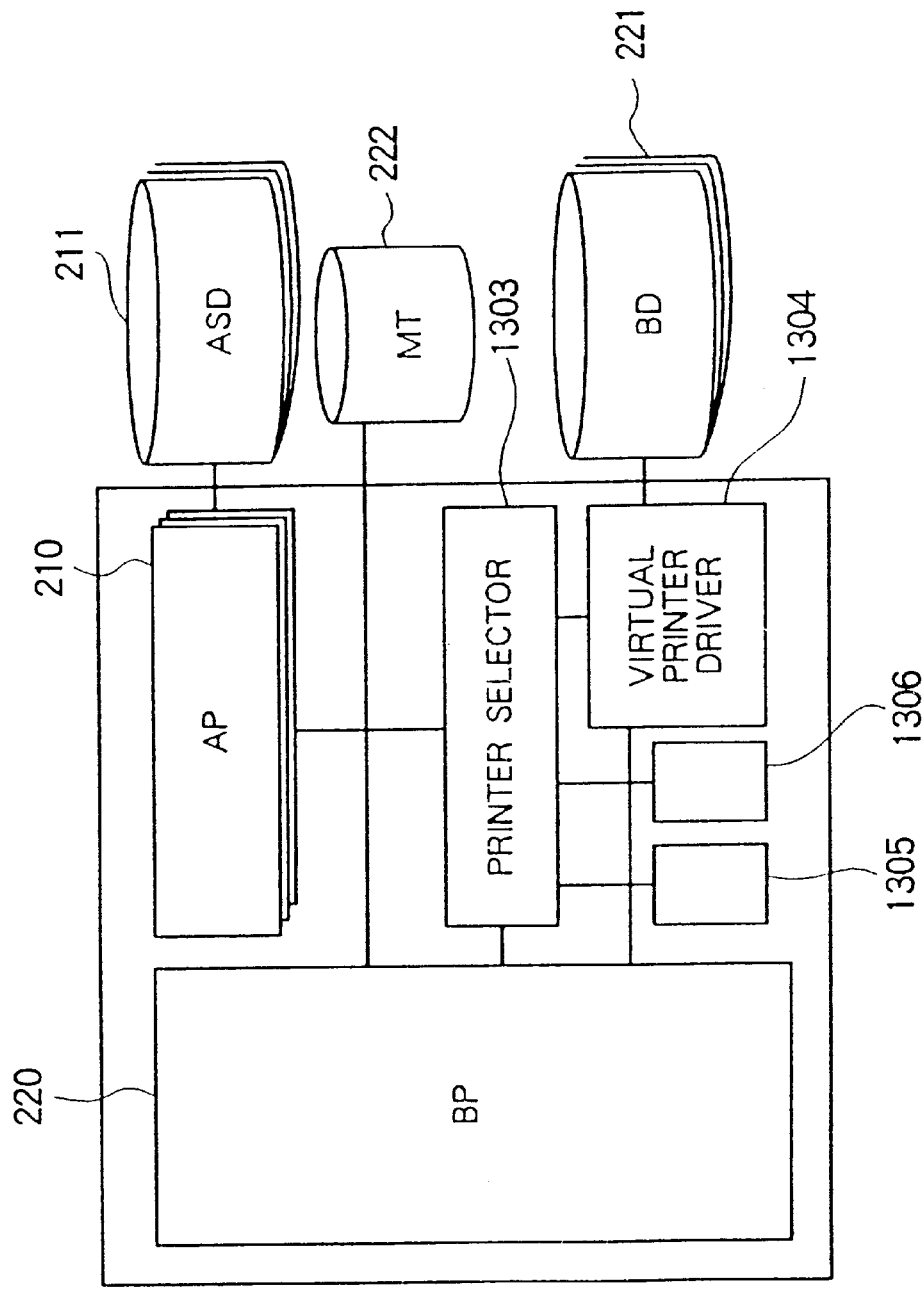
FIG. 14 shows a second example of the software structure stored in the storage device.

A second example of the hardware configuration for embodying the invention is shown in FIG. 13, and a second example of the software structure for embodying the invention in FIG. 14. In FIGS. 13 and 14, numerals 100, 101, 102, 103, 110, 200, 210, 211, 220, 221 and 222 have the same meaning as the corresponding numerals in FIG. 1 respectively. Also, numerals 1301, 1302 designate a printer for printing the data created by the application; numerals 1305, 1306 a printer driver for controlling the printers 1301, 1302 respectively; numeral 1303 a printer selector for selecting a printer used for printing out of a plurality of printers; and numeral 1304 a virtual printer driver having the same interface as the printer drivers 1305, 1306 for creating the browsing data from the data output to the printing means by the application program 210. Each program and each datum are appropriately read into the main memory 100 from the storage device 110 and executed by the central processing unit (CPU) 101.

Figure 15:
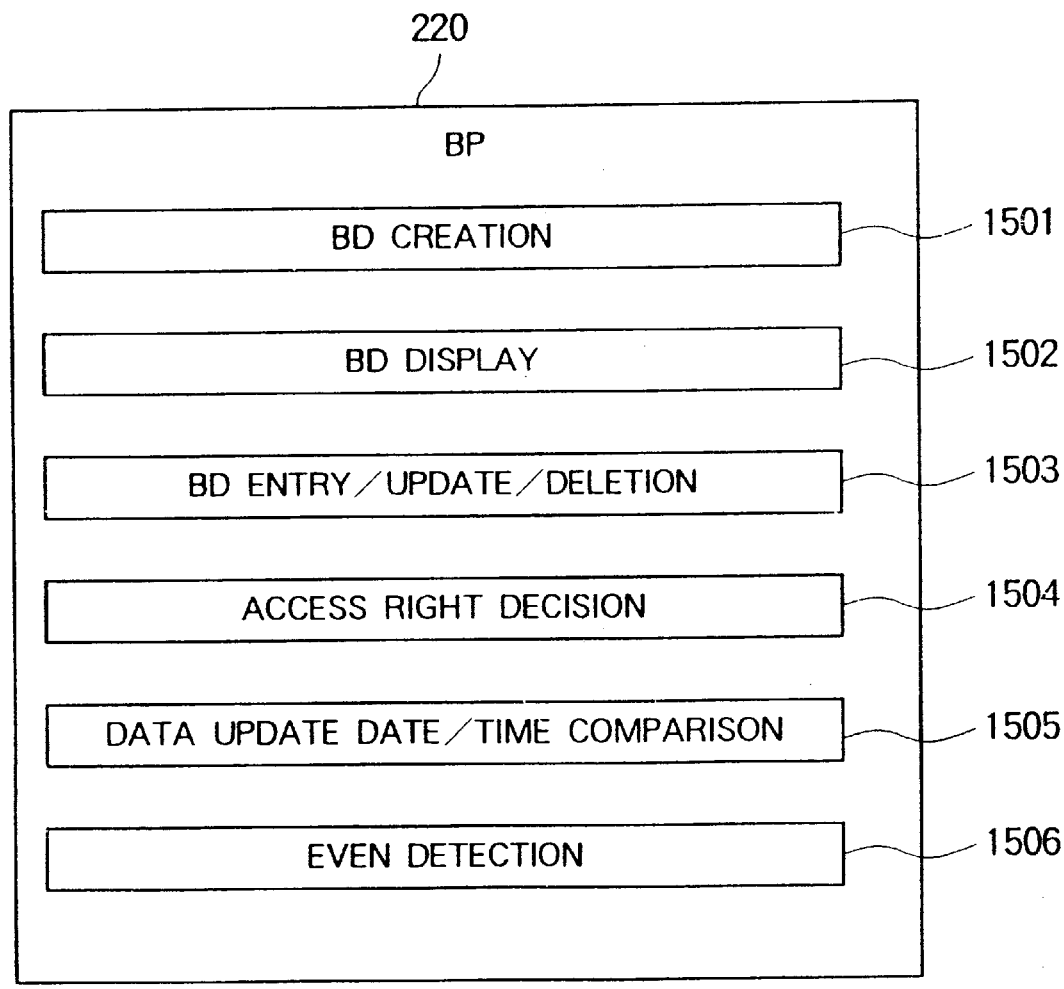
FIG. 15 is a functional block diagram showing a browsing program (BP) 220.

FIG. 15 shows an example of the functional block diagram for the browsing program 220. The browsing program 220 includes a browsing data creation section 1501, a browsing data display section 1502, a browsing data entry/update/delete section 1503, a permission decision section 1504 for deciding whether a given user is capable of reading from or writing to a given file, a data update date-time comparator 1505 for deciding whether the update date and time of given data is more recent than that of the corresponding browsing data, and an event detector 1506.

Figure 11:
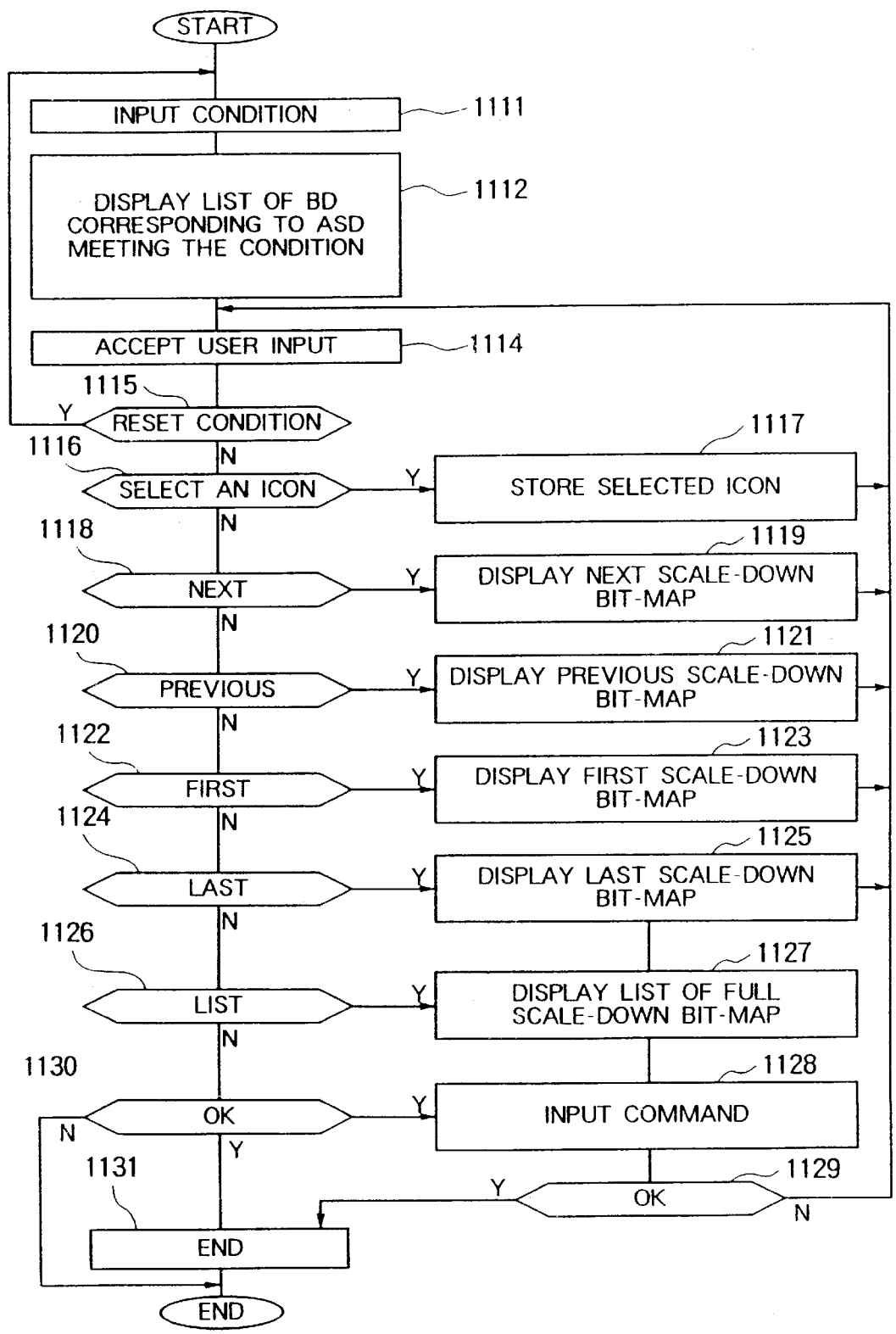
FIG. 11 is a diagram showing the steps of processing the display of a list of browsing data.
Figure 12:
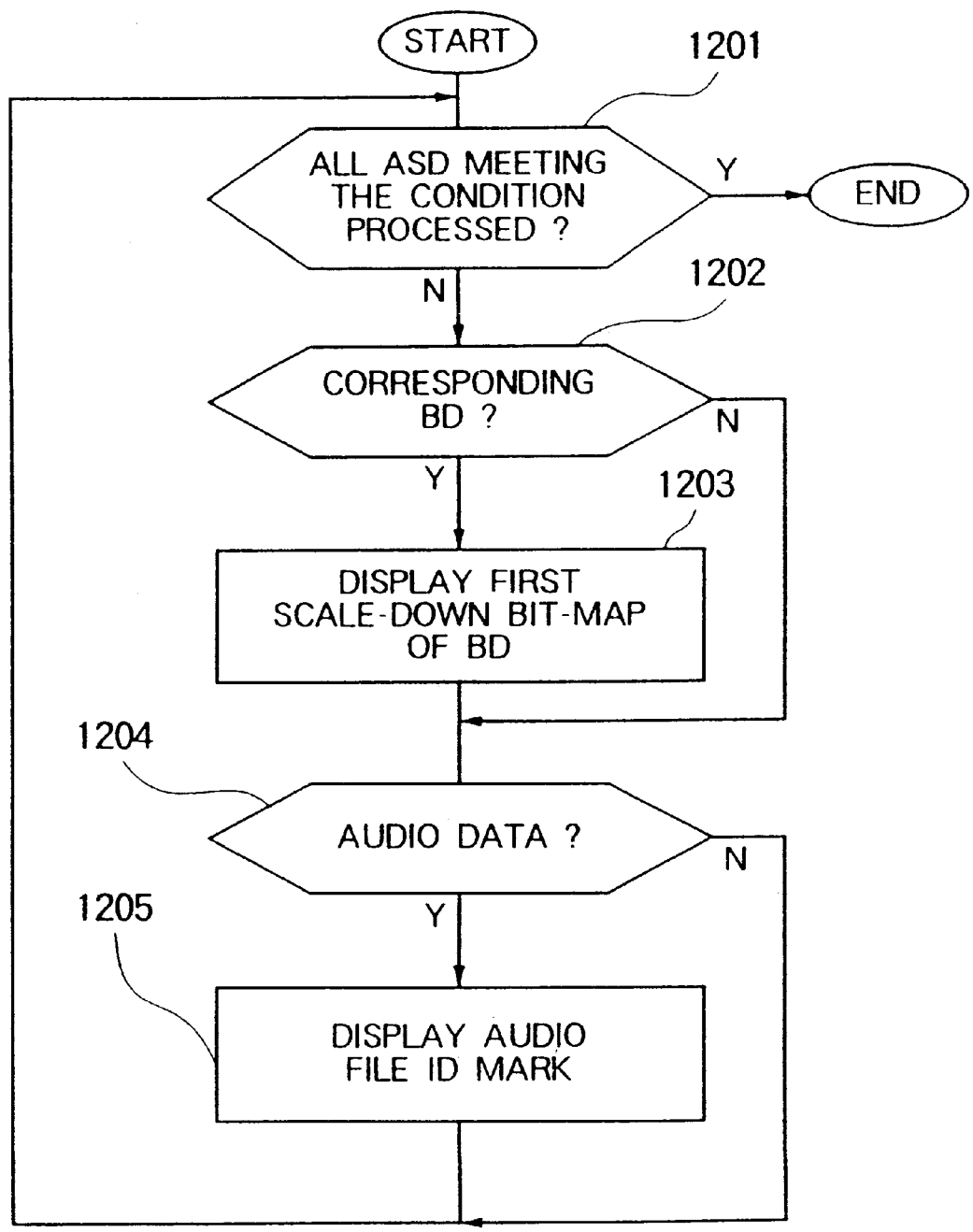
FIG. 12 shows the details of step 1112 in FIG. 11.
Figure 16:
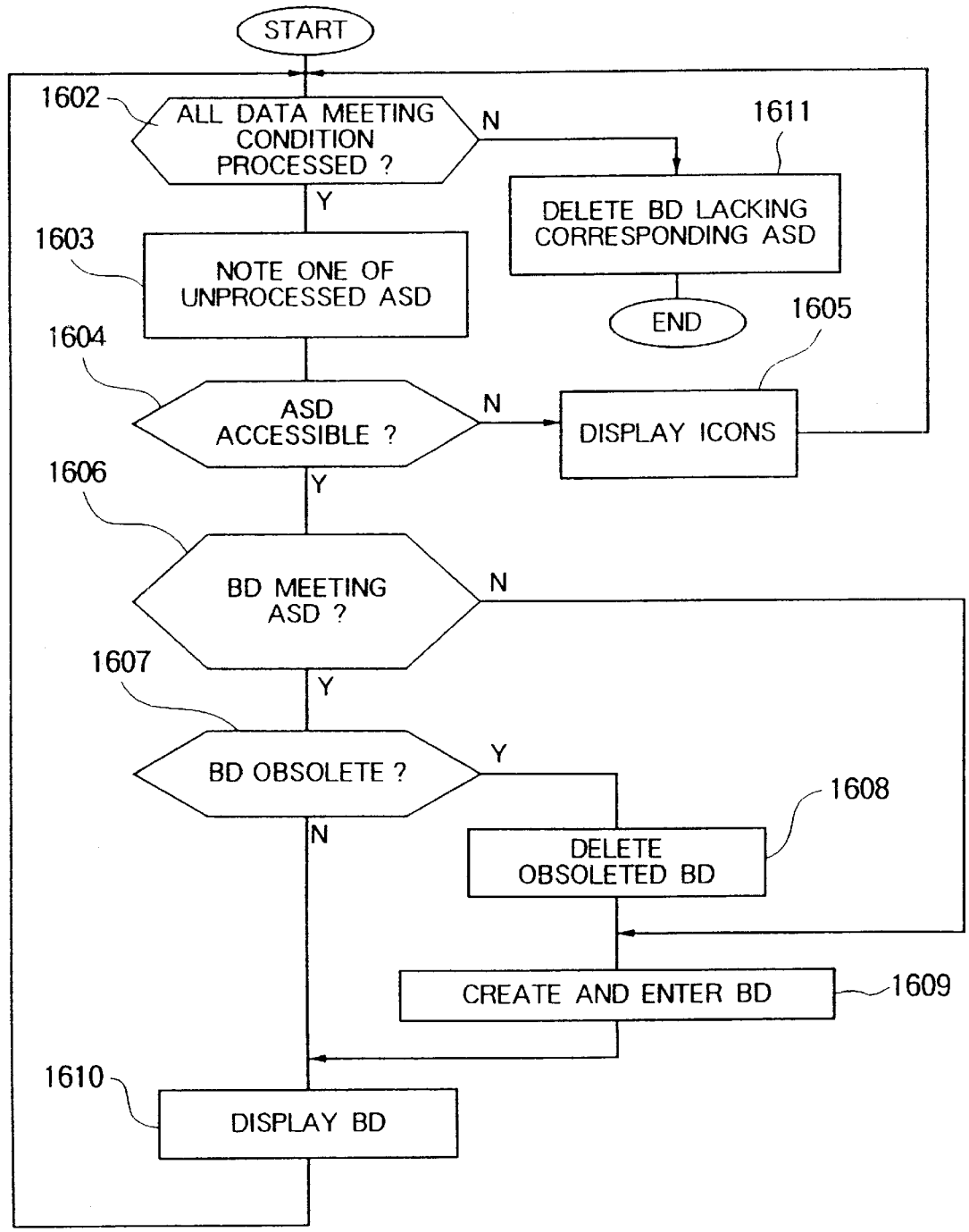
FIG. 16 is a detailed diagram showing a second example of step 1112 in FIG. 11.
Figure 17:
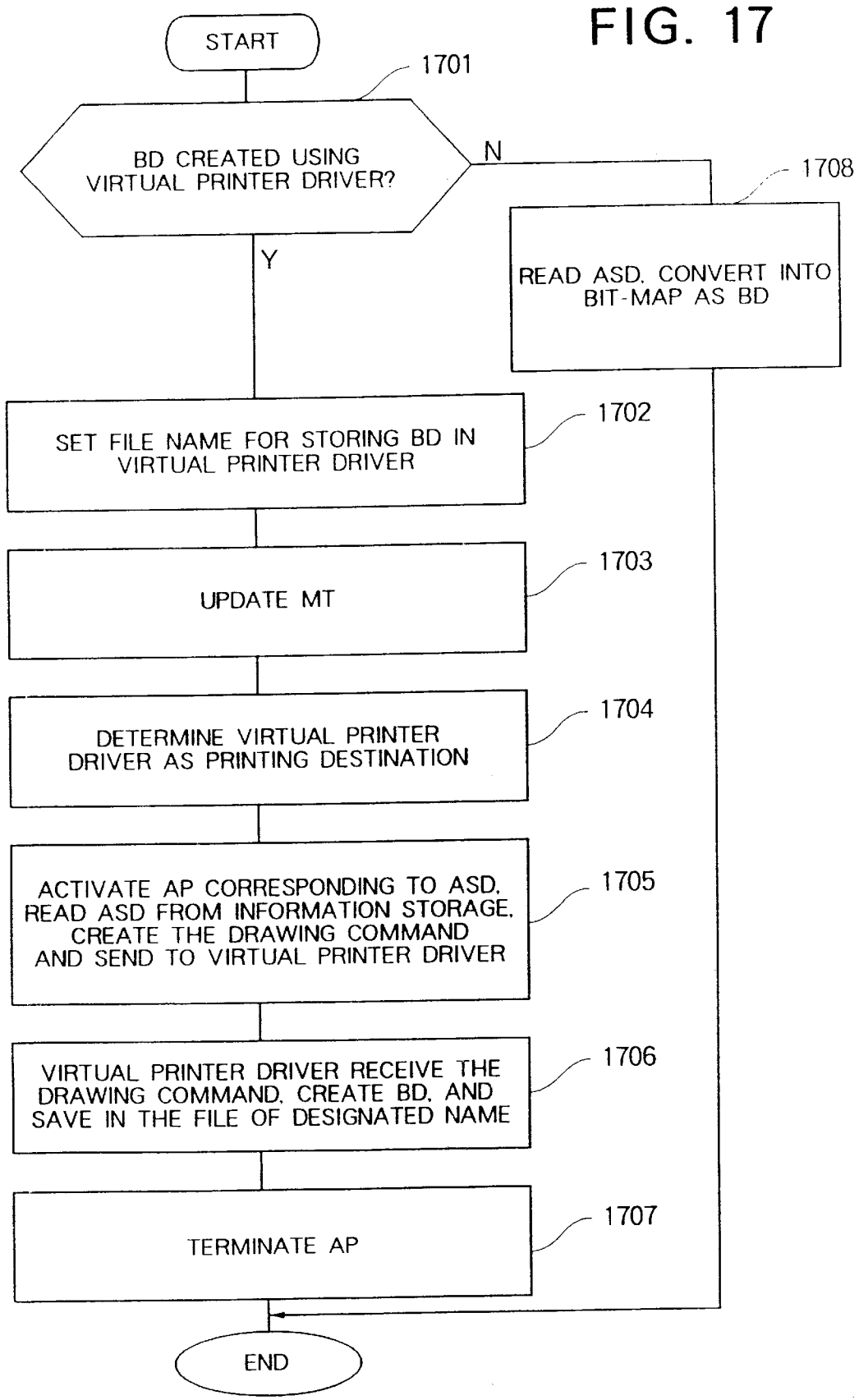
FIG. 17 is a diagram showing the details of step 1609 for creating the browsing data in FIG. 16.

A second example of step 1112 of FIG. 11 is shown in detail in FIG. 16 (different from the example shown in FIG. 12), and step 1609 of FIG. 16 for creating the browsing data is shown in detail in FIG. 17.

Now, explanation will be given in detail for step 1112, i.e., about the steps of processing the browsing program 220 when the browsing data corresponding to the application-specific data meeting a user-designated condition is displayed on the display unit, with reference to FIGS. 13, 14, 3 and 16.

The process is performed with respect to all of the application-specific data 211 meeting the designated condition. More specifically, a decision is made as to whether there exists any data 211 remaining unprocessed (step 1602), and if there is any, one of the unprocessed data 211 is noted (step 1603), and whether or not the noted application-specific data 211 is accessible by the user is decided (step 1604). When the particular data is not accessible by the user, an icon for other than the browsing data is displayed on the display unit 102 (step 1605), with the process returning to step 1602. When the data is accessible, on the other hand, a decision is made as to whether there exists any browsing data 221 corresponding to the application-specific data 211 by searching the management table 222 (step 1606). If there is any such data available, a decision is made as to whether the date and time of creating the browsing data 221 is older than that of the application-specific data 211 from FIG. 18 (step 1607). If the creation date and time of the browsing data 221 is not older than the update date and time of the application-specific data 211, the browsing data 221 is displayed (step 1610). When step 1606 decides that there is no browsing data 221 corresponding to the application-specific data 211, the browsing data 221 is newly created and stored in a browsing data file (step 1609), while executing step 1610. When the decision at step 1607 is that the browsing data 221 created earlier than the application-specific data 211 is updated, the old browsing data file 221 is deleted, and the record relating to the particular browsing data file 221 in the management table 222 is deleted (step 1608), while executing step 1609. When an unprocessed file does not exist as decided at step 1602, the browsing data 221 lacking the application-specific data 211 in the management table 222 is deleted. The record related to the browsing data 221 deleted from the management table 222 is also deleted (step 1605), thus terminating the process.

In the work station or the personal computer, as shown in FIG. 18, a file name 1801 is managed together with the owner 1802 of the file, the owner's access right (permission) 1803, the access right 1804 of other than the owner, the last update date and time 1805 and the corresponding application program name 1806 as file attributes. The application-specific data is also managed in the same manner as the browsing data. The decision at steps 1604 and 1607 are made using these attributes.

Now, the operation at step 1609 for creating and entering the browsing data will be explained in detail with reference to FIGS. 13, 14, 3 and 17.

First, the name of a file where the browsing data 221 is to be stored is created automatically from the file name of the application-specific data 211. In FIG. 17, whether a virtual printer driver is to be used or not for creating the browsing data depends on the type of the application-specific data (step 1701). When the data type is a text or a bit-map, the process branches to step 1708, while if the data type is a word processor document or a spreadsheet document, the process branches to step 1702. The data type can be determined from the data file name such as an extender. Step 1708 converts the application-specific data into a bit-map image, and by scaling down the bit-map image, creates the browsing data. When a virtual printer driver is used, on the other hand, the file name of the browsing data is set in the virtual printer driver (step 1702), and a record is newly created on the management table 222. The file name of the application-specific data 211 is entered at 300, and the file name set at step 1702 is entered at 301 (step 1703). A command for selecting the virtual printer driver 1304 is issued to the printer selector 1303, and the printing destination is set to the virtual printer driver 1304 (step 1704). The application program 210 corresponding to the data 211 is activated, the data 211 is read, and the printing data is sent to the virtual printer driver 1304 by executing the print command (step 1705). Upon execution of the print command by the application program 220, a drawing command for printing is sent through the printer selector 1303 to the virtual printer driver 1304. The virtual printer driver 1304 thus creates the browsing data 221 based on the drawing command, and saves it in the file of the name designated at step 1701 (step 1706). As the last step, the application program 210 is terminated (step 1707), thereby ending the process.

The printer driver, as described in Nikkei Mac October 1993 issue, pp. 186–193, outputs by converting the drawing command (printing data) sent from the application program into a printer language corresponding to the printer in a form understandable by the printer. The drawing command as referred herein is defined as a command such as "print a character", "print a line", "print a rectangle" or "print a bit-map". Also, the printer language is defined as a data format used for instructing the printer, and generally varies with the printer type. At step 1706, the virtual printer driver writes a character, a pattern, a figure or the like corresponding to each command into a bit-map in the memory instead of converting a drawing command into a printer language with a drawing command as an input, thus creating the browsing data.

Also, the application program activated at step 1705 is determined at 1806 in FIG. 18.

According to the present embodiment, browsing data is created and displayed in the absence of browsing data or in the presence of old browsing data (step 1609). Instead, the user may be informed that there is no browsing data or the browsing data, if any, is old, while at the same time graphics, i.e., an icon or an illustration determined for each conventional application or old browsing data may be displayed temporarily, and the browsing data may be created in parallel to the next step, so that the browsing data is displayed at the time of complete creation. Also, in the absence of browsing data, the user may be inquired as to whether browsing data are newly created or a conventional icon is displayed.

Further, a decision as to whether an icon or the browsing data is displayed, which is made based on whether the application-specific data is accessible by the user (step 1604, FIG. 16) according to the present embodiment, may alternatively be made by deciding whether or not the browsing data is accessible at step 1604 by setting the same access right as that of the application-specific data in the browsing data when the browsing data is created at step 1609. The access right to the browsing data is set by entering with the table shown in FIG. 18.

Figure 19:
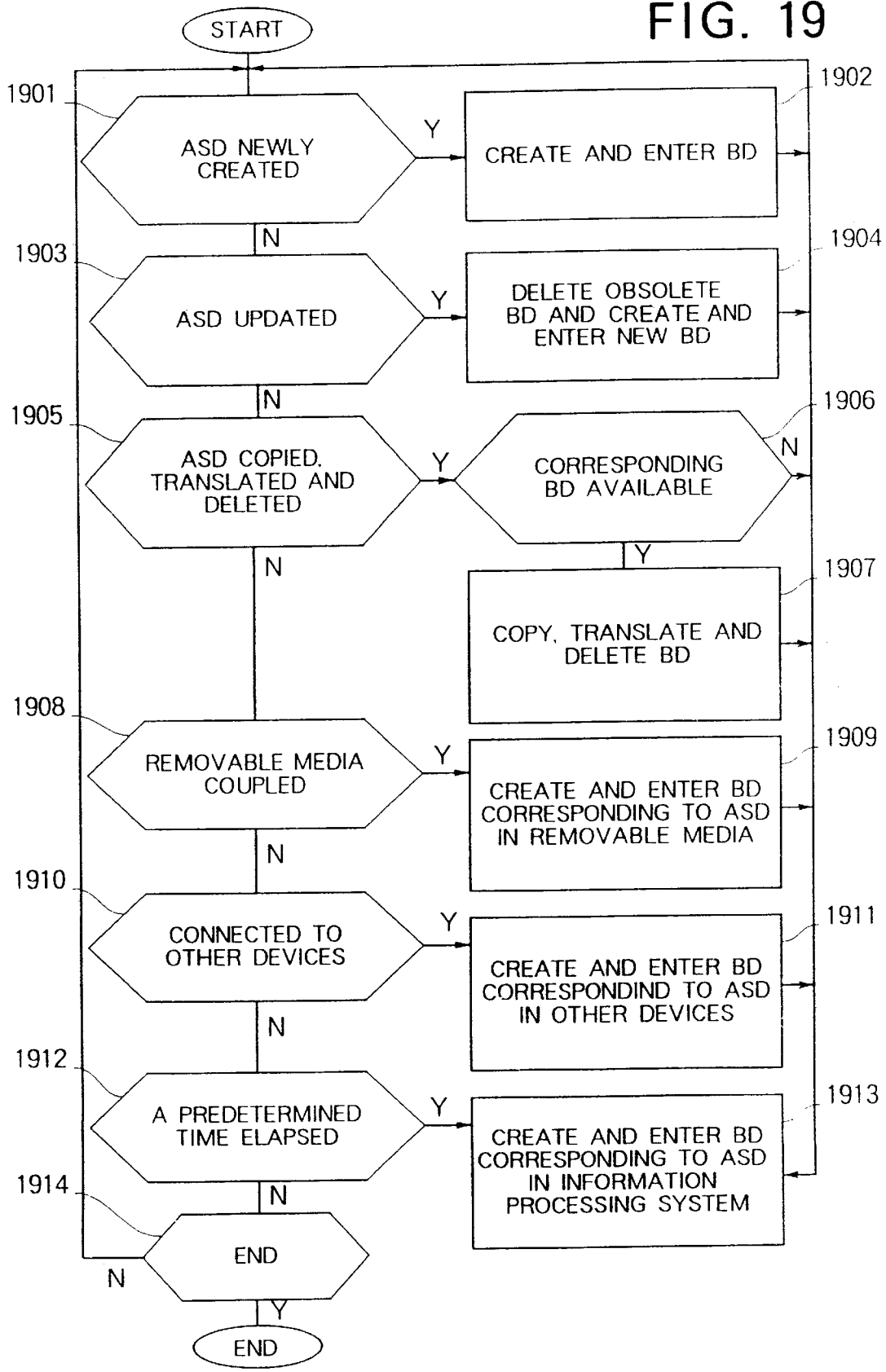
FIG. 19 shows an example of flow of steps for processing the event detection program.

Also, the decision as to whether there is browsing data (step 1606), the decision as to whether or not the browsing data is old (step 1607), the steps following those decisions (steps 1608, 1609) and the step for deleting the browsing data (step 1611), which are made at the time of displaying the browsing data according to the present embodiment, may alternatively be made upon detection of any of the following events by a detector 1506 belonging to the browsing program 220. In other words, the detector 1506 is adapted to detect such events as the lapse of a predetermined length of time, creation, deletion, update, copying or translation of the application-specific data, or coupling of removable media such as a magnetic optical disk or a floppy disk to the information processing system or connecting thereof to other work stations through a network. The flow of related steps is described below with reference to FIG. 19.

First, upon detection of an event of new creation of the application-specific data (step 1901), the browsing data corresponding to the data thus created is created and entered (step 1902). When the event of updating the application-specific data is detected (step 1903), the old browsing data is deleted and the browsing data corresponding to post-update data is created and entered (step 1904). Upon detection of the event of copying, deletion or translation of the application-specific data (step 1905), a decision is made as to whether the corresponding browsing data is available (step 1906), and if available, the particular browsing data is copied, translated or deleted, as the case may be (step 1907). When the network connect event of a removable media is detected (step 1908), the browsing data corresponding to the application-specific data in the removable media is created and entered (step 1909). Upon detection of a device connect event (step 1910), on the other hand, the browsing data corresponding to the application-specific data in such other devices is created and entered (step 1911). Upon lapse of a predetermined length of time (step 1912), the browsing data corresponding to the application-specific data in the information processing system is created and entered (step 1913). Upon detection of a termination event which occurs when the operator indicates a termination (step 1914), the process is terminated.

The process for creation and entering of the browsing data at steps 1902 1904, 1909, 1911 and 1913 is similar to that shown by the process flow in FIG. 17. Also, steps 1909, 1911, 1913 perform the processes other those performed at steps 1610 and 1605 in FIG. 16 with respect to all of the data in the removable media, in the information processing system and in the devices connected to the network.

Creation of the browsing data requires an application program for editing/printing the application-specific data. In the absence of an application program, steps 1902, 1904, 1909, 1911, 1913 inform the user of the fact, so that the process proceeds to the next step without creating the browsing data.

According to the embodiment under consideration, the browsing data is created less frequently at the time of displaying the browsing data, and therefore fast access is made possible.

When a considerable time is required for processing steps 1909, 1911, 1913, the job may be executed in small pieces when the load is small on the system units.

A third embodiment of the invention will be explained below with reference to the accompanying drawings.

This embodiment relates to a browsing method in the case where the media data is AV data including audio data and video image data such as in MPEG format configured of a plurality of sequential video image frames and voice data.

Figure 20:
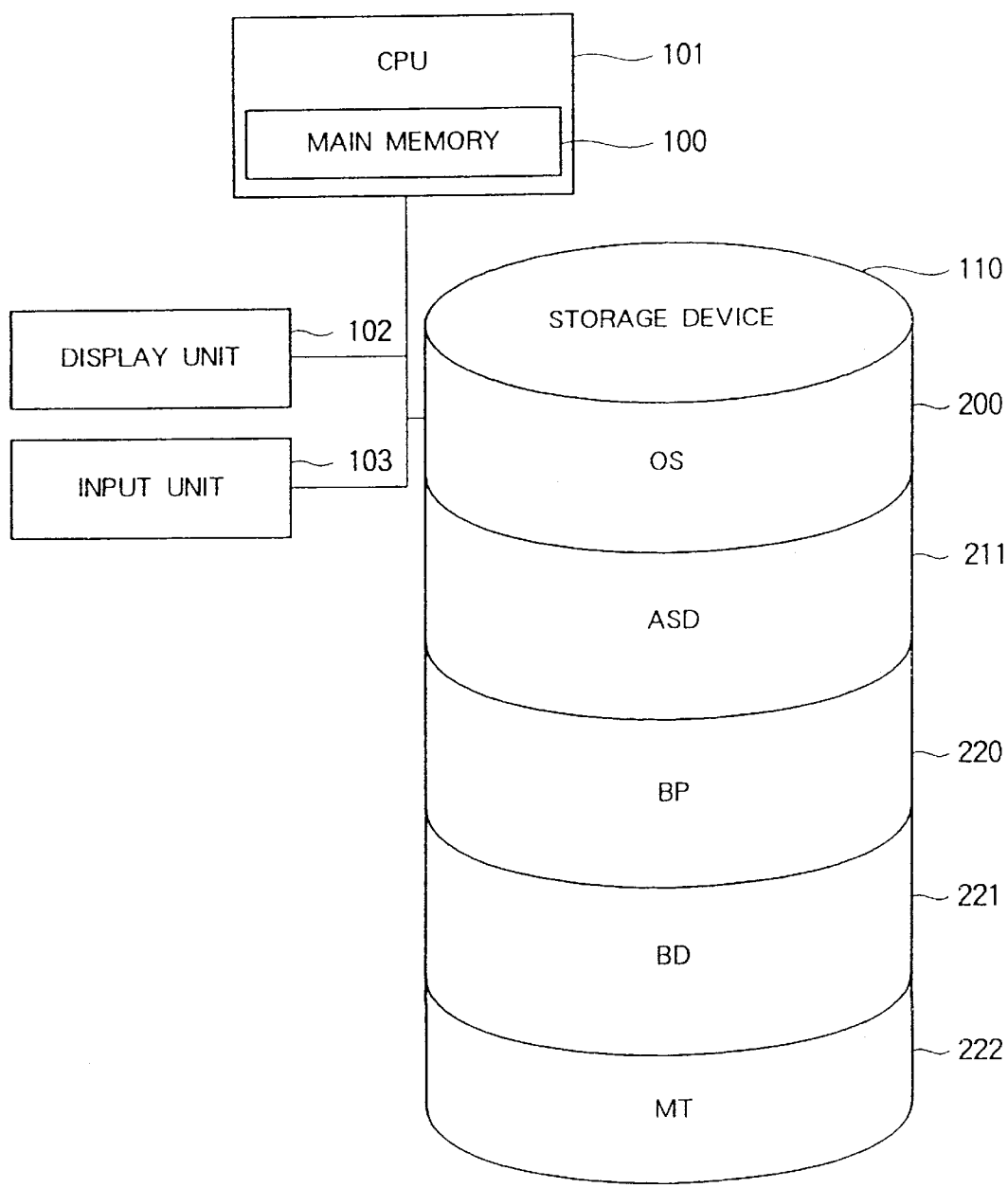
FIG. 20 shows a third example of the hardware configuration for embodying the invention.

A third example of the hardware configuration for embodying the present invention is shown in FIG. 20. In FIG. 20, numerals 100, 101, 102, 103, 110, 200, 211, 220, 221, 222 have the same meaning as the corresponding numerals respectively in FIG. 1. According to the present embodiment which relates to a method of browsing AV data, however, the application-specific data is assumed to be AV data.

Figure 21:
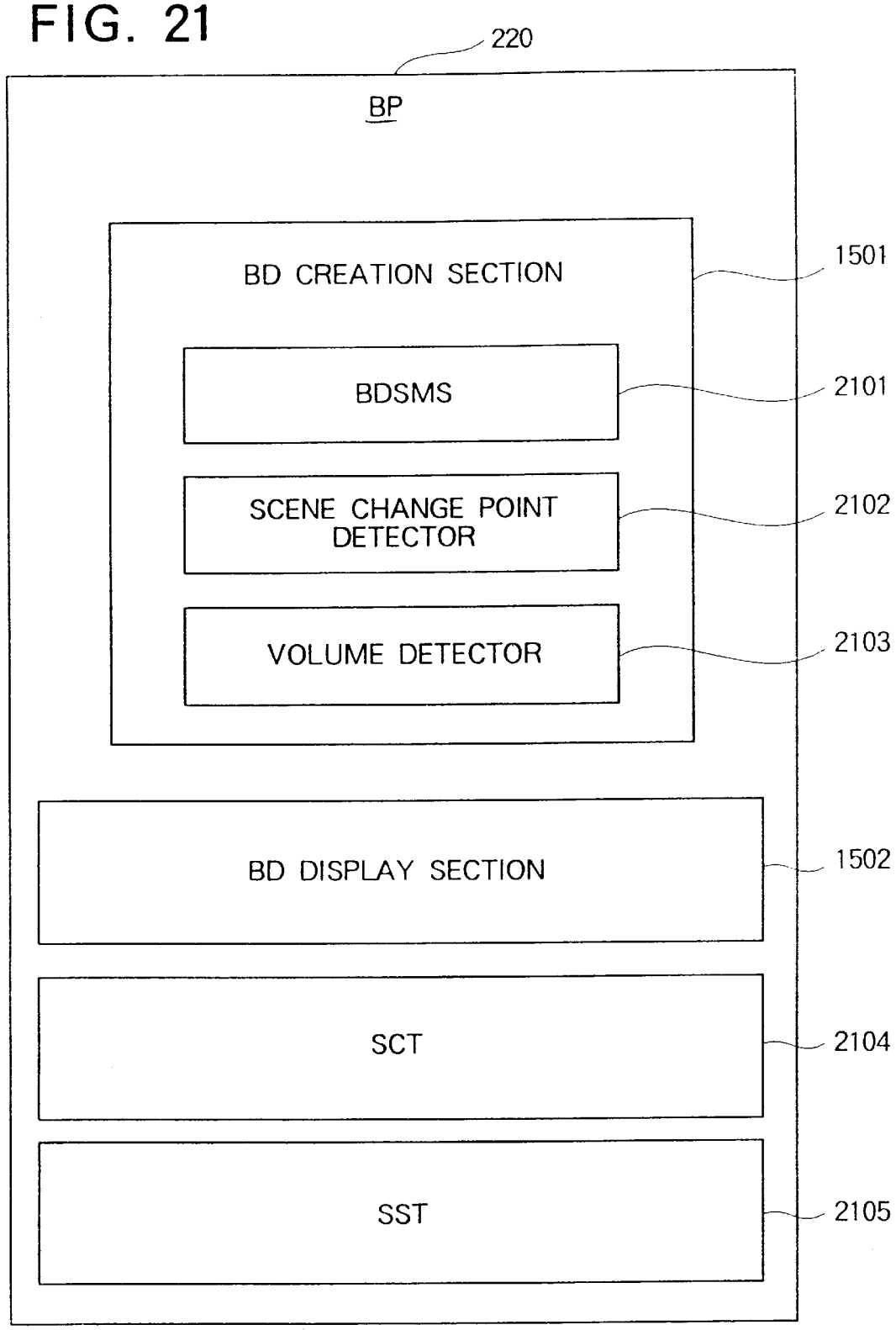
FIG. 21 is a diagram showing a third example of the functional block for the browsing program 220.

A second example of the functional block diagram of the browsing program 220 is shown in FIG. 21. The browsing program 220 includes a browsing data creation section 1501, a browsing data display section 1502, a scene characteristic table 2104 and a scene selection table (SST) 2105. The browsing data creation section 1501 in turn includes a browsing data search management section 2101, a scene change point detector 2102 for detecting a scene change point of video image data and a volume detector 2103 for detecting the per-frame volume of the video image data.

First, the step of detecting a scene change point will be explained. The detection of a scene change point can be effected using the motion vector information indicating the parallel movement of the whole image and correlation between two temporally continuous frames. More specifically, first, a small two-dimensional block is determined within a frame, and the correlation of each block is taken between temporally continuous two frames (square of an error, for example), and a decision is made as to whether a correlation exists (by magnitude of the square of an error). In the presence of a correlation (when the square of an error is small), continuous scenes are considered to exist, with no scene change point occurred. The mere frame correlation, however, may lead to the erroneous decision that a scene attributable to the parallel movement of the camera such as pan (lateral movement) or tilt (vertical movement) is a scene change point. To prevent this inconvenience, the amount of parallel movement of the screen, i.e., the motion vector is further detected, and a decision is made as to whether a scene change point is involved based on the motion vector (continuous scenes are considered involved when a motion vector is detected). The detection of a motion vector is determined from the relation between the spatial gradient of the frame image and the inter-image difference, for example. A method of detecting a motion vector is described in detail in "Image Encoding Techniques Permitting Large-Scale Information Compression", by Kimura, et al., Hitachi Journal (Hitachi Hyoron), Vol. 74, No. 9, September 1992.

A method of motion vector detection will be described. A representative method of motion vector detection is the block matching method. The block matching method will be described with reference to FIG. 30. In the block matching method, a macroblock (a 16-by-16 pixel block) of an image to be encoded is compared with all the macroblocks of the previous image, and the vector to the macroblock with the minimum image difference is employed as a motion vector. When a motion vector for the macroblock 3001 is desired, for example, the position of the macroblocks 3002 to 3007 read from the previous image is displaced by a small amount progressively (displaced by two each time in X-axis direction in the shown drawing). Each block thus read is compared with the macroblock 3001, and a block with the smallest image difference (the block 3004 in the drawing shown) is determined. The block matching is effected as many times as the number of blocks available as a candidate. In FIG. 30, the vector (6, 0) is employed as a motion vector.

As a result, the occurrence of a scene change point is decided when no motion vector is recognized in the absence of an interframe correlation.

The process for volume detection will be explained. The direct use of the volume value of each frame might incur a large effect of noises of each frame. In order to remove noises for each frame, the volume value for each frame is taken as an average of three temporally continuous frames before and after a frame for which volume determination is desired, i.e., an average among a total of seven frames including the frame for which determination of the volume is desired. The resulting average value is defined as the volume value of the particular frame. Of course, other noise-removing schemes may alternatively be used.

Figure 31A:
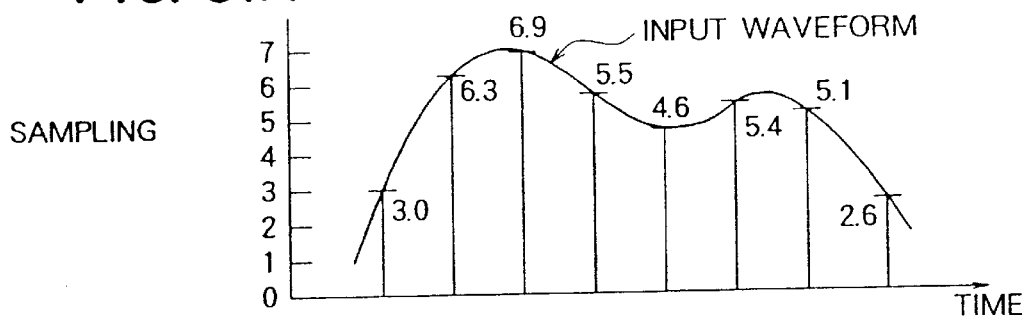
FIG. 31 is a diagram for explaining a method for detecting the volume of each frame.
Figure 31B:
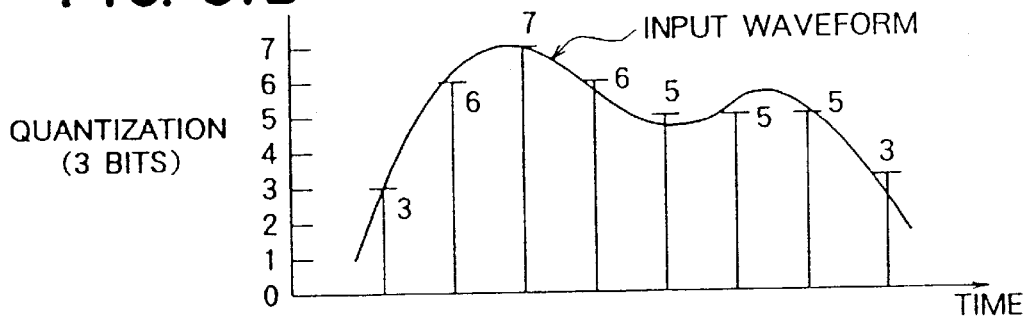
Figure 31C:
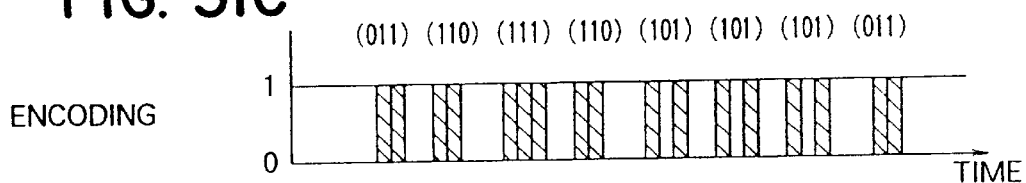

A method for detecting the volume of each frame will be explained. Normally, for digitizing a sound wave form, it is necessary to perform sampling, quantization and encoding in that order as shown in FIG. 31. In the sampling process, the time is divided into small units, and the height of the waveform is observed in unit time. The quantization process is such that the waveform height is segmented into units of a binary number configured of a predetermined number of digits. In the encoding process, on the other hand, the sound wave form is converted into a digital signal of a value obtained by quantization. With an ordinary music compact disk, the sampling frequency (number of time points counted per second in sampling) is 44.1 kHz, and the number of quantization bits (details by which the sound intensity is segmented for quantization) is 16 bits.

Figure 32:
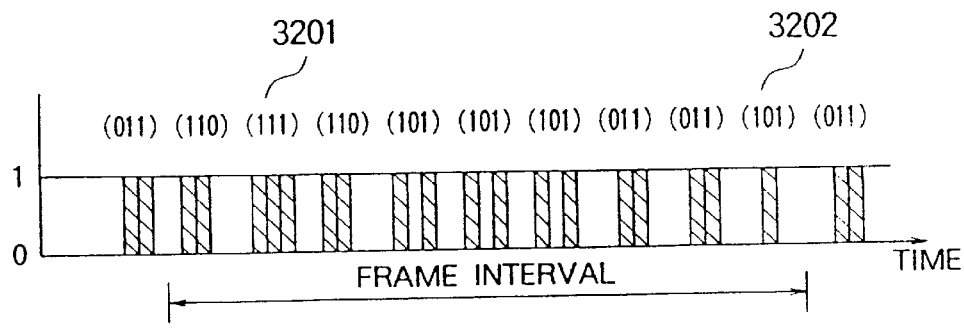
FIG. 32 is a diagram for explaining a method for detecting the volume of each frame.

The volume of each frame, therefore, can be determined, as shown in FIG. 32, based on a maximum value 3201, for example, among a plurality of encoded numerical values within a one-frame time. Of course, the average or minimum value 3202 of the encoded values within a time corresponding to a frame may alternatively be defined as the volume representing the particular frame.

According to the present embodiment, the method for scene change point detection and the method for volume detection use the above-mentioned definition of the frame volume, the motion vector and the inter-frame correlation.

Figure 22:
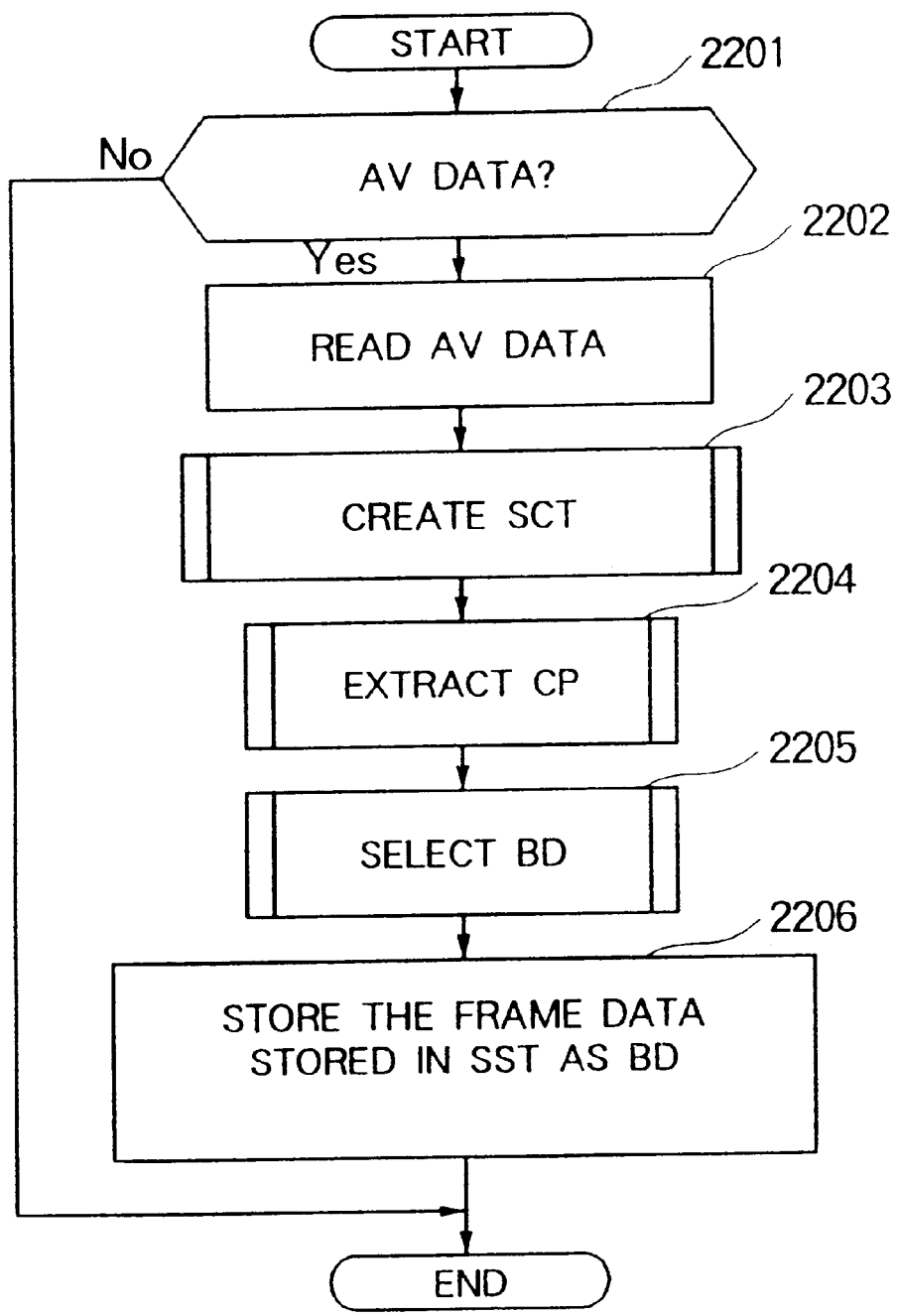
FIG. 22 is a diagram showing the steps of processing the entry of the browsing data for AV data.

Now, an example of operation of the systems shown in FIGS. 20 and 21 will be explained with reference to FIGS. 22, 28 and 29. FIG. 22 is a flowchart showing a method of browsing data entry for AV data. Specifically, this flowchart represents a second example extended from the example method of browsing data entry shown in FIG. 8. Also, FIG. 28 shows a scene characteristic table prepared by the browsing data generator 1501 for storing the information for each scene required during the creation of the browsing data. Each row of the table is adapted to store the scene last frame number, scene length, average volume, maximum volume frame number (MVFN), maximum volume (MV), maximum volume difference frame number (MVDFN) and the maximum volume difference (MVD) of each scene. By realizing this table from a list for chaining records, the table size can be changed arbitrarily. FIG. 29 shows a selection table for storing the characteristic parts of the AV data, which table is generated by the browsing data generator 1501.

First, as shown in FIG. 22, the browsing data generator 1501 decides from the file name whether the designated application-specific data is AV data or not (step 2201), and if it is not AV data, terminates the process. When the designated application-specific data is AV data, on the other hand, the browsing data selection and management section (BDSM) 2101 reads the AV data (step 2202). The browsing data selection and management section 2101, in order to clarify the characteristic part of the video image file, requests the scene change point generation information and the volume information of each frame from a scene change point detector 2102 and a volume detector 2103, and creates a scene characteristic table (SCT) 2104 shown in FIG. 28 (step 2203). The browsing data selection and management section 2101 selects the characteristic part (CP) of the video image file as an selection table 2105 on the basis of the information obtained from the scene characteristic table 2104 (step 2204). Each row of the selection table 2105 stores the maximum volume, maximum volume difference, first frame number and the last frame number of each scene making up the browsing data. The table size can be modified arbitrarily by realizing the table with a list. The browsing data selection and management section 2101 selects the browsing data (BD) from the selection table on the basis of the condition set by the input unit 103 (step 2205). Finally, with the first frame in the selection table as the browsing data 221, the name of the browsing data created in this process is written as the browsing data name of the management table 222 (step 2206), thus terminating the process.

Figure 23:
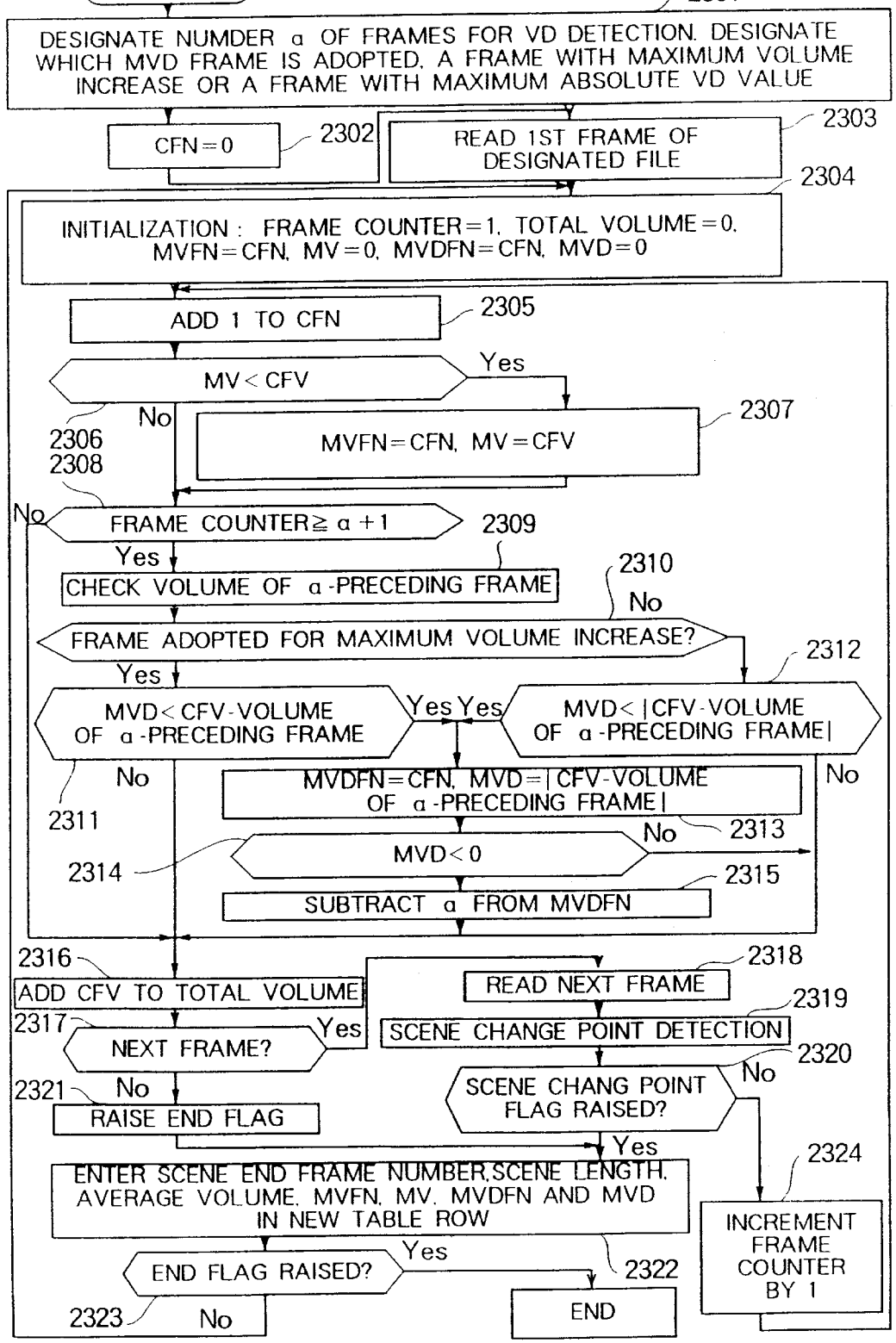
FIG. 23 is a diagram showing the steps of processing the creation of the scene characteristic table (SCT) in FIG. 22.
Figure 24:
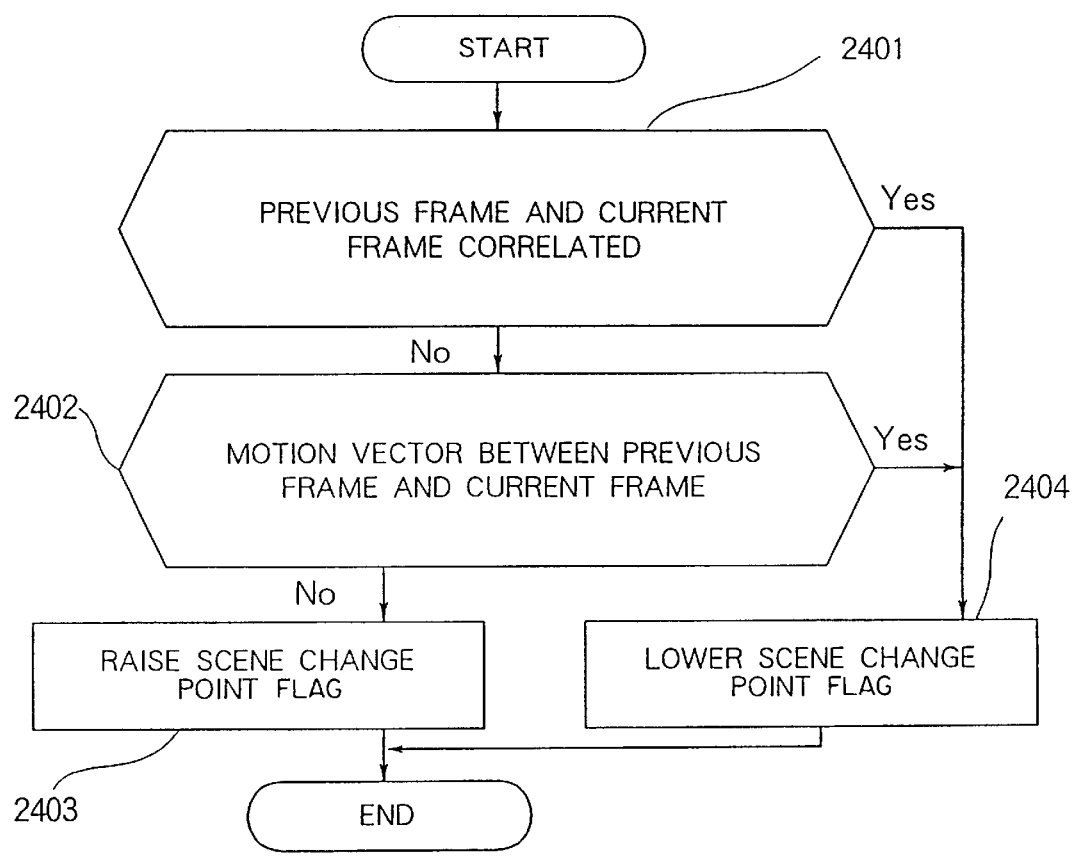
FIG. 24 is a diagram showing the steps of processing the scene change point detection in FIG. 23.
Figure 25:
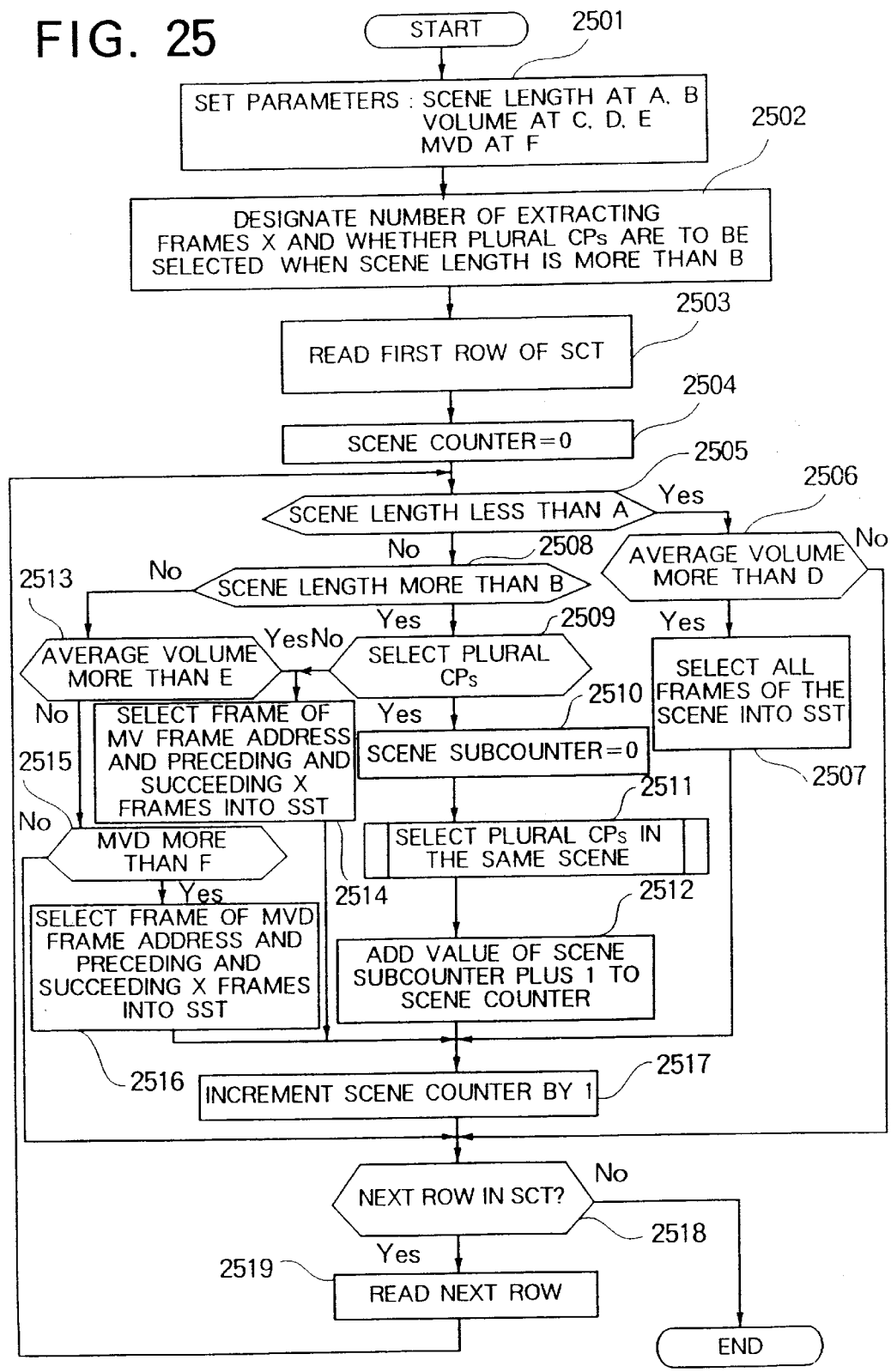
FIG. 25 is a diagram showing the steps of processing the selection of a characteristic part in FIG. 22.
Figure 26:
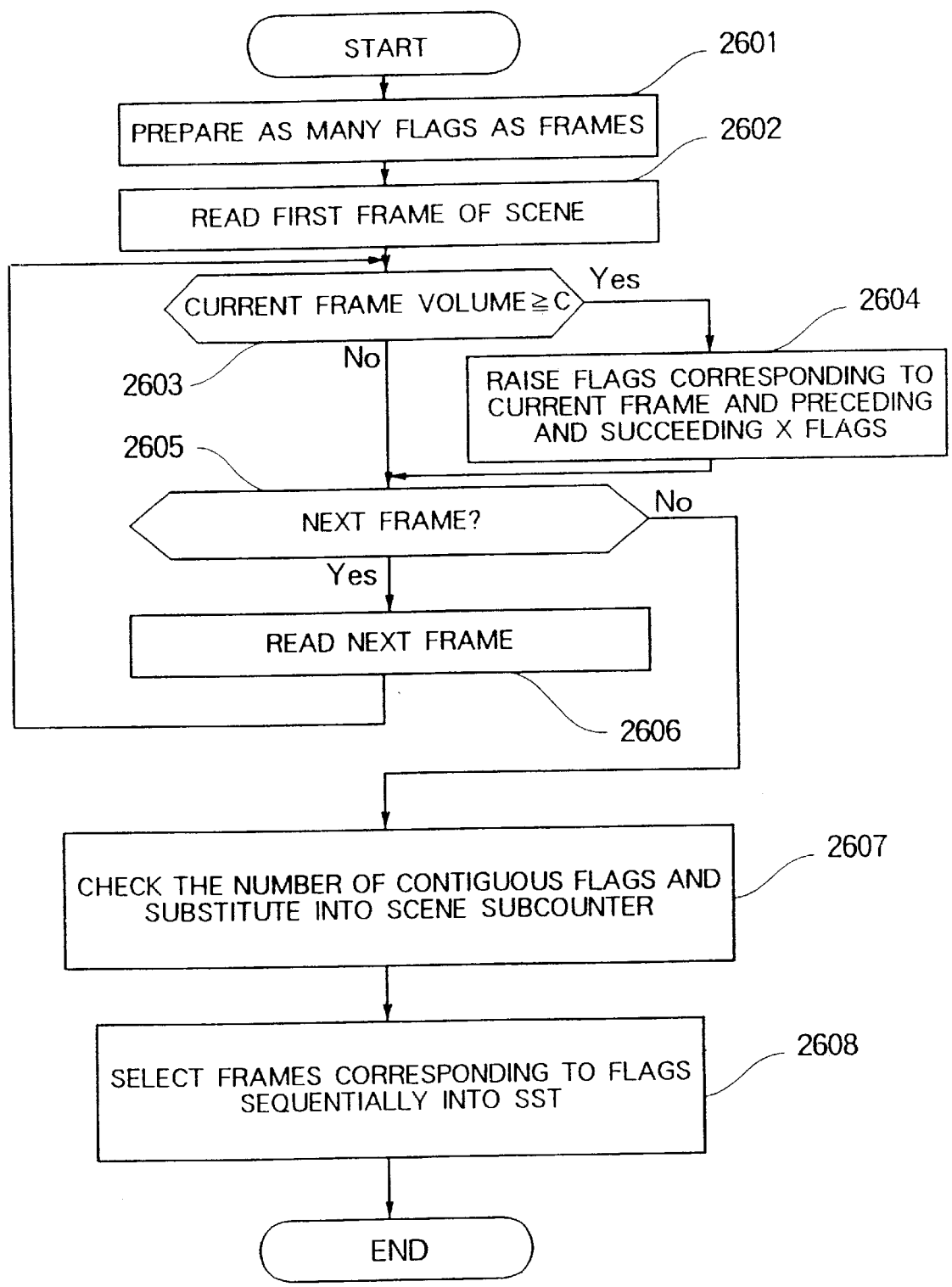
FIG. 26 is a diagram showing the steps of processing the selection of a plurality of characteristic parts of a scene in FIG. 25.
Figure 27:
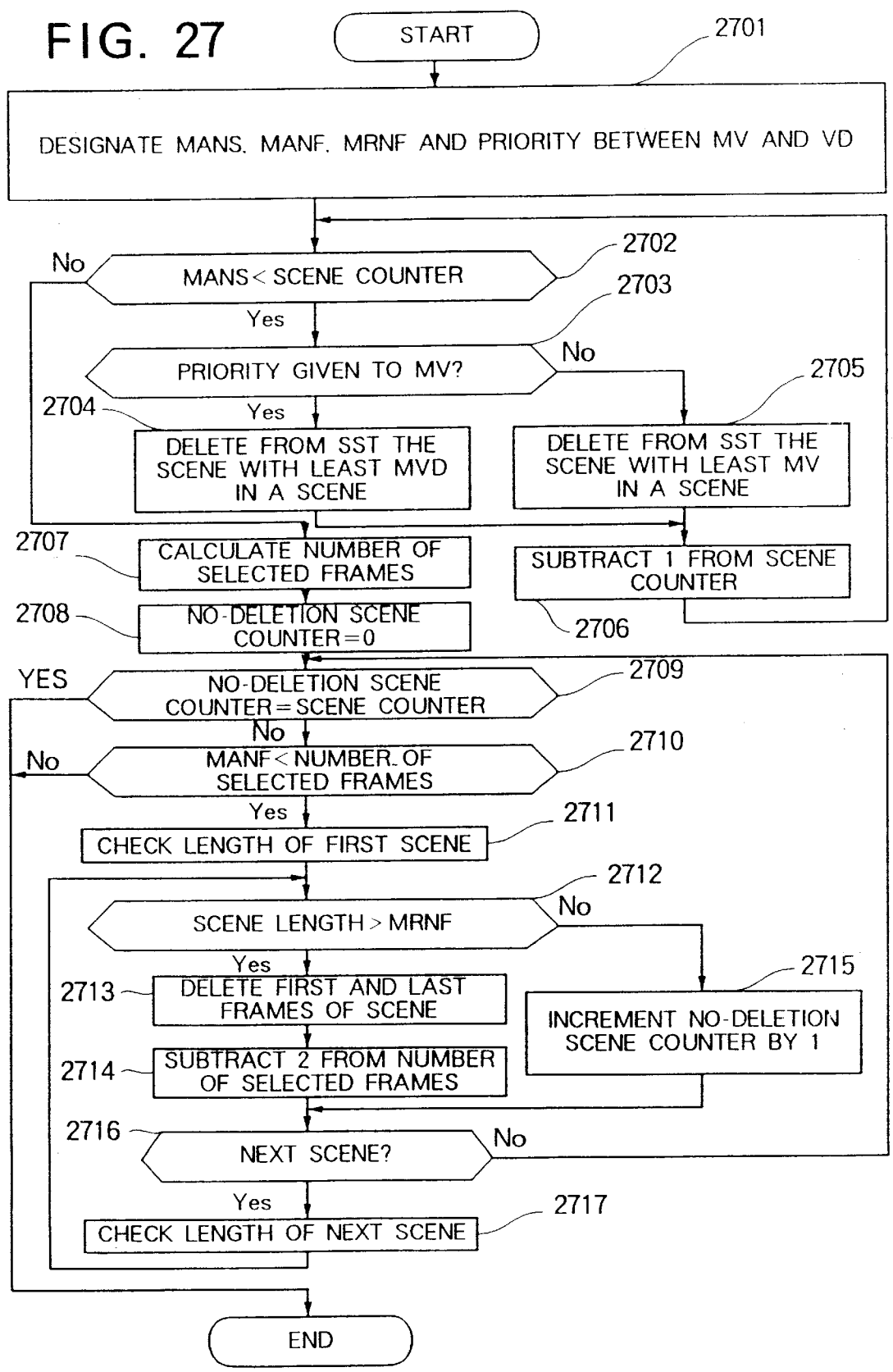
FIG. 27 is a diagram showing the steps of processing the selection of browsing data in FIG. 22.

The contents of the processes including the creation of the scene characteristic table, the selection of the characteristic part and the selection of the browsing data in the flowchart of FIG. 22 are illustrated in the flowcharts of FIGS. 23, 25 and 27 respectively. Further, the contents of the process for scene change point detection in the flowchart of FIG. 23 and selection of plural characteristic parts in the same scene in the flowchart of FIG. 25 are illustrated in the flowcharts of FIGS. 24 and 26 respectively. The contents of the processes shown in the flowcharts of FIGS. 23 to 27 will be described below in that order.

An example operation of the scene characteristic table creation (step 2203) shown in FIG. 23 will be explained. First, in detecting the volume difference between the current frame and a given previous frame, the number α of immediately preceding frames to retroactively reach such a previous frame is designated by the operator through the input unit 102. In detecting a frame associated with the maximum volume difference with a frame a frames before (such a frame hereinafter being referred to as the α-preceding frame), the operator designates through the input unit 102 which is adopted, a frame associated with the maximum volume increase or a frame associated with the maximum volume change, i.e., the maximum absolute value of the volume difference (step 2301). The current frame number (CFN) which is a count of frames starting from the first frame of a video file is set to zero (step 2302). The first frame of the designated file is read (step 2303). As the initial value, the frame counter for counting the number of frames per scene is set to 1, the total volume representing the total volume of each frame per scene is set to 0, the maximum volume frame number representing the location of the frame associated with the maximum volume in a scene is set to the current frame number, the maximum volume representing the volume of the particular frame is set to 0, the maximum volume difference frame number representing the location of a frame associated with the maximum volume difference with the α-preceding frame in a scene is set to the current frame number, and the maximum volume difference representing the volume difference between the current frame and the α-preceding frame is set to 0 (step 2304). The current frame number is incremented by 1 (step 2305). Whether the volume of the currently read frame is larger than the maximum volume (step 2306), and if larger, the maximum volume frame number is replaced with the current frame number, and the maximum volume with the volume value of the current frame (step 2307).

Next, prior to determining the volume difference with the α-preceding frame, it is necessary to check whether the α-preceding frame exists in the same scene. Step 2308, therefore, checks to see whether the value of the frame counter is α+1 or more. When the value of the frame counter is α+1 or more, comparison with the volume of the α-preceding frame is possible. Therefore, after detecting the volume of the α-preceding frame (step 2309), when a frame associated with the maximum volume increase is taken as the maximum volume difference frame, the maximum volume difference is checked to see whether it is smaller than the volume of the current frame less the volume of the α-preceding frame (steps 2310, 2311). When a frame associated with the maximum absolute value of the volume difference is taken as the maximum volume difference frame, on the other hand, the particular maximum volume difference is checked to see whether it is smaller than the absolute value of the volume of the current frame less the volume of the α-preceding frame (steps 2310, 2312). When the result is affirmative, the current volume difference assumes the maximum volume difference. Therefore, the current frame number is substituted into the maximum volume difference frame number, and the absolute value of the volume of the current frame less the volume of the α-preceding frame into the maximum volume difference (step 2313). Further, when the value of the maximum volume difference is smaller than 0 (step 2314), α is subtracted from the maximum volume difference frame number (step 2315). This is in view of the fact that when the difference is taken along the downward direction of volume, it is desirable to select the first downward frame as a volume-decreasing frame.

Next, the volume of the current frame is added to the total volume (step 2316), followed by checking to see whether the next frame exists or not (step 2317). In the presence of the next frame, the next frame is read (step 2318), and through the scene change point detection step (step 2319), step 2320 checks to see whether the scene change point flag is raised or not. If the flag is not raised, a 1 is added to the frame counter (step 2324), after which a 1 is again added to the current frame number (step 2305). When the flag is raised, on the other hand, the current frame number providing the scene last frame number 2801, the value of the frame counter providing the scene length 2802, the total volume divided by the value of the frame counter providing the average volume 2803, the value of the maximum volume frame number (MVFN) 2804, the value of the maximum volume (MV) 2805, the value of the maximum volume difference frame number (MVDFN) 2806, the value of maximum volume difference (MVD) 2807, respectively, are entered in a new row of the scene characteristic table (SCT) 2104 shown in FIG. 28 (step 2322). When the last flag is raised, the process for creation of the scene characteristic table is terminated, while if the flag is not raised, the process returns to the initialization (step 2304) to continue the process for the second time. An example operation for creation of the scene characteristic table (step 2203) of FIG. 22 was explained above.

An example operation for scene change point detection (step 2319) shown in FIG. 23 will be described with reference to FIG. 24. First, the process checks to see whether there is a correlation between the previous frame and the current frame (step 2401) and whether there is a motion vector (step 2402). In the absence of motion vector or correlation between the previous frame and the current frame, the scene change point flag is raised assuming that a scene change point has occurred (step 2403), thereby terminating the scene change point detection process. When a correlation and/or a motion vector is detected, on the other hand, it is decided that the previous frame and the current frame are present in the same scene, and the scene change point flag is lowered (step 2404), thereby terminating the scene change point detection process. The foregoing description concerns an example operation of scene change point detection (step 2319) shown in FIG. 23.

Now, an example operation of characteristic part selection (step 2204) shown in FIG. 22 will be explained with reference to FIG. 25. First, the scene lengths a, b, the volumes c, d, e and the maximum volume difference f are set by the operator through the input unit 102 as parameters for selecting the characteristic parts (step 2501). In addition, the number of frames to be selected preceding and following the characteristic frame as a characteristic part is designated by the operator with a variable x through the input unit 102 (step 2502). Also, step 2502 designates whether or not a plurality of characteristic parts are to be designated when the scene length is b or more. The first row of the scene characteristic table 2104 is read (step 2503), and the value of the scene counter is set to 0 (step 2504).

After that, the situation is divided by scene length. First, in order to make sure whether the object scene is shorter than a predetermined length, the scene length 2802 is checked to see whether it is a or less (step 2505). If the scene length 2802 is not a or less, a further check is made to see whether the scene length 2802 is longer than a predetermined length by seeing whether the scene length 2802 is b or more (step 2805). When the scene length is a or less, the average volume 2803 is checked to see whether it is d or more (step 2506). When the average volume 2803 is d or more, a characteristic part is decided even with a short scene length 2802. In that case, in order to select all the frames of the scene into the selection table, the value of the maximum volume 2805 is entered as the maximum volume 2902, the value of the maximum volume difference 2807 as the maximum volume difference 1903, the scene last frame number less the scene length plus one as the first frame number 2904, and the scene last frame number 2801 as the last frame number 2905 (step 2507). After that, the scene counter is incremented by one (step 2517). When the average volume 2803 is smaller than d, the particular part is determined as not characteristic, and no action is taken.

When the scene length 2802 is not more than b, the scene length is determined to be an intermediate one, so that the average volume 2803 is checked to see whether it is e or more (step 2513). When the average volume 2803 is e or more, the part associated with the maximum volume is considered a most characteristic part in the scene. Then, in order to select a frame associated with the maximum volume frame number and a number x of the preceding and succeeding frames into the selection table, the value of the maximum volume 2805 is entered as the maximum volume 2902, the value of the maximum volume difference 2807 as the maximum volume difference 2903, the maximum volume frame number less x as the first frame number 2904, and the value of the maximum volume frame number plus x as the last frame number 2905 (step 2514), and the scene counter is incremented by one (step 2517). When the average volume 2803 is smaller than e, on the other hand, the maximum volume difference 2807 is checked to see whether it is f or more (step 2515). When the maximum volume difference 2807 is f or more, it is decided that the part associated with the maximum volume difference is the most characteristic part of the scene, so that in order to select a frame associated with the maximum volume difference frame number and the preceding and succeeding x frames into the selection table, the value of the maximum volume 2805 is entered as the maximum volume 2902, the value of the maximum volume difference 2807 as the maximum volume difference 2903, the maximum volume difference frame number less x as the first frame number 2904, and the maximum volume difference frame number plus x as the last frame number 2905, respectively (step 216), and the scene counter is incremented by one (step 2517). When the maximum volume difference is smaller than f, on the other hand, it is decided that the particular scene is not characteristic and no action is taken.

When the scene length is b or more, on the other hand, it is decided that a scene longer than a predetermined value is involved, and whether or not a plurality of characteristic parts are to be selected from the particular scene is determined (step 2509). When a plurality of characteristic parts are to be selected, a scene subcounter for counting the number of the characteristic parts is set to 0 (step 2510), and the characteristic part of the scene is extracted by a plural characteristic parts selection process in the same scene (step 2511). The scene subcounter less one is added to the scene counter (step 2511), after which the scene counter is incremented by one (step 2517). In other words, considering steps 2512 and 2517 in combination, the operation at these steps is equivalent to adding the value of a scene subcounter to the value of a scene counter. When a plurality of characteristic parts are not selected from within the same scene, it is decided that the part associated with the maximum volume is the most characteristic par in the scene. As a result, in order to select a frame of the maximum volume frame number and a number x of preceding and succeeding frames into the selection table, the value of the maximum volume 2805 is entered as the maximum volume 2902, the value of the maximum volume difference 2807 as the maximum volume difference 2903, the maximum volume frame number less x as the first frame number 2904, and the maximum volume frame number plus x as the last frame number 2905 (step 2514), followed by incrementing the scene counter by one (step 2517).

After proceeding through any one of the above-mentioned steps, the scene characteristic table 2104 is checked to see whether it contains the next row (step 2518), and if the result is affirmative, the particular row is read, followed by checking to see whether the scene length is a or less (step 2505), with the process continued. In the absence of the next row, the characteristic part selection step is terminated. The foregoing is an explanation of an example operation of the characteristic selection section shown in FIG. 22.

An example operation of the same-scene plural characteristic parts selection step (step 2511) shown in FIG. 25 is explained with reference to FIG. 26. First, flags in the same number as the frames of a scene from which a plurality of characteristic parts are selected are prepared, and are allocated the numbers from the scene last frame number less scene length plus one to the scene last frame number, in a one-to-one relationship with each frame (step 2601). The first frame of the scene to be selected is read (step 2602), and the volume of the current frame is checked to see whether it is c or more (step 2603). If the volume of the current frame is c or more, flags corresponding to the current frame and a number x of the preceding and succeeding frames are raised. After that, a check is made to see whether the next frame exists or not, and if it exists, the particular frame is read (step 2606), so that whether the frame volume is c or more is checked (step 2603). In the absence of the next frame, on the other hand, the number of parts associated with temporally continuous raised flags is determined, and the resulting value is set in the scene subcounter (step 2607). Finally, in order to extract frames associated with the flags into the selection table, the value of the maximum volume 2805 is entered as the maximum volume 2902, the value of the maximum volume difference 2807 as the maximum volume difference 2903. In the absence of the next frame, the temporally continued parts associated with a raised flag are checked for their total number and the resulting value is set in a scene subcounter (step 2607). Finally, in order to select a frame corresponding to the flag into the selection table, the value of the maximum volume 2805 is entered as the maximum volume 2902, the value of the maximum volume difference 2807 as the maximum volume difference 2903, the first flag number of the continuous parts as the first frame number 2904, and the last number of the continuous parts as the last frame number 2905, in that sequence (step 2608), so that the step is completed for selecting a plurality of characteristic parts within the same scene. An example operation of selection of a plurality of characteristic parts in the same scene shown in FIG. 25 was explained above (step 2511). The process of step 2603 may be replaced by the process of checking to see whether the volume change for the frame a predetermined interval away from the current frame is more than a predetermined value or not.

Now, explanation will be given for an example operation of browsing data selection (step 2205) shown in FIG. 22 with reference to FIG. 27. First, the maximum allowable number of scenes specifying the maximum number of scenes for the browsing data and the maximum allowable number of frames specifying the maximum number of frames are designated. Also, in order to prevent the number of frames making up a characteristic part from being reduced so excessively as to make it difficult to understand the contents of the particular characteristic part, a minimum required number of frames is designated which specifies the lower limit of the number of frames making up a scene. Further, which is preferred as browsing data, a characteristic part associated with a large maximum volume and a characteristic part associated with a large maximum volume difference (step 2701). Next, the value of the scene counter is checked to see whether it is more than the maximum allowable number of scenes (2702). When the value of the scene counter is larger than the maximum allowable number of scenes, the number of selected scenes is required to be reduced. Thus the advisability of giving priority to the characteristic scene associated with a large maximum volume over the characteristic scene associated with a large maximum volume difference as the browsing data is studied (step 2703). When such a priority is given, a scene associated with the least maximum volume difference is deleted, while when such a priority is not given, a scene associated with the least maximum volume is deleted from the selection table (steps 2704 and 2705). After that, one is subtracted from the scene counter (step 2706), and the process is returned again to step 2702, where the same process is repeated until the value of the scene counter reaches a number less than the maximum allowable number of scenes. In the process, the scene associated with the least last frame number is deleted from a plurality of scenes, if any, associated with the least maximum volume or the least maximum volume difference.

For the number of selected scenes less than the maximum allowable number of scenes, first, the number of selected frames providing the total sum of the last frame number less the first frame number plus one in each row of the selection table is calculated (step 2707), and a no-deletion scene counter is set to 0 (step 2708). The no-deletion scene counter is for counting the number of scenes for which the number of frames has decreased below the minimum required number of frames. Next, the no-deletion scene counter is checked to see whether the value thereof is equal to the value on the scene counter (step 2709). When the value of the no-deletion scene counter is equal to the value of the scene counter, it indicates the absence of a deletable scene. The browsing data selection is thus terminated. When the value of the no-deletion scene counter is not equal to the value of the scene counter, on the other hand, the number of selected frames is checked to see whether it is greater than the maximum allowable number of frames (step 2710). When the number of selected frames is smaller than the maximum allowable number of frames, frame deletion is not required, and the browsing data selection process is terminated.

When the number of selected frames is greater than the maximum allowable number of frames, the number of selected frames is required to be reduced. First, the length of the first scene is calculated as the last frame number less the first frame number plus one (step 2711), while checking to see whether the scene length is larger than the minimum required number of frames (step 2712). When the scene length is larger than the minimum required number of frames, frames can be reduced from the particular scene. In order to reduce the frames of the scene one by one from the first and last frames thereof, 1 is added to the first frame number of the scene, with 1 subtracted from the last frame number (step 2712), and 2 is subtracted from the number of selected frames (step 2714). When the scene length is not larger than the minimum required number of frames, on the other hand, further reduction of the frames would make the contents of the scene difficult to understand. Therefore, frame deletion from the particular scene is considered impossible, and the no-deletion counter is incremented by 1 (step 2715). Next, the selection table is checked to see whether the next scene is included in the table (step 2716). In the presence of the next scene, the length of the next scene is calculated (step 2717). This process is repeated from step 2712 until the next scene disappears. When the next scene comes to disappear, the process is returned to step 2709. This process is repeated until the no-deletion scene counter is equal to the scene counter and the number of selected frames is reduced below the maximum allowable number of frames. An example operation of browsing data selection (step 2205) of FIG. 22 is described above.

In the above-mentioned embodiment, various parameters for creating the browsing data are set entirely by the operator through the input section 103. Alternatively, the information in the scene characteristic table stored in the browsing data selection and management section 1043 may be used as parameters. As c of FIG. 25, for example, a value 1.5 times the average volume of the particular scene may be used. For this purpose, c is not set at step 2501, but to a value equal to the average volume multiplied by 1.5 at the time of starting step 2511 for selection of plural characteristic parts in the same scene. Also, a value equal to 10% of the scene length of the whole video file may be used as a scene length b, or a value twice the average volume of the whole video file may be used as a volume e. In these cases, b and e may be set at step 2501 in such a way that b is the total sum of scene length in the scene characteristic table multiplied by 0.1, and e is (the total sum of the products of scene length and average volume) divided by (the total sum of scene length).

Further, although the aforementioned embodiment assumes that the browsing data is stored as a frame (bit-map image), the scene selection table may be directly as browsing data. In such a case, at the time of browsing, a frame corresponding to the first frame number 2904 in the first row of the scene selection table 2105 is displayed in the scale-down bit-map data display section 905 in FIG. 9. When the FIRST, LAST, NEXT or PREVIOUS button is depressed, the video data in the first, last, next or previous row respectively in the scene selection table is played back. Also, upon depression of the LIST button, the frames corresponding to the first frame number 2904 for all the rows in the scene selection table are displayed as a list.

The browsing data may be generated each time of browsing without being stored in the storage device 110.

Currently, tape devices such as VTR are a mainstream of image-storing media for handling AV data. The tape as a storage medium is considered to be a low-speed mass storage adapted for sequential access. With a system using such a medium, in order to improve the retrieval efficiency, the browsing data may be stored in separate storage media (such as a hard disk) capable of high-speed random access. In such a case, high-speed retrieval of a video film is made possible, and the operator can play back only the required scenes from the tape.

Furthermore, the digital video editing system includes the job of A/D converting and storing (downloading) information in a digital medium (hard disk or the like) in the system from analog tape. According to this embodiment, the browsing data may be created at the time of performing such a job. In that case, high-speed search of a video file becomes possible immediately after downloading.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method for managing media data in an information processing program stored on a computer readable medium, said method comprising the steps of:
   a) performing a selected one of a plurality of operations including creating, inputting, playing, editing and storing of media data based on an application program;
   b) creating bit-map image browsing data associating contents of a plurality of data output by said step a) if said plurality of data output by said step a) is non-visible data;
   c) associating the data output by said step a) with the bit-map image browsing data;
   d) displaying a list of names of a plurality of said data output by said step a) and the bit-map image browsing data indicating said plurality of data as pairs; and
   e) storing s aid data output by said step a), said browsing data output by said step b) and the association output by said step c).

2. In a management table for an information processing system, each of a plurality of records in said management table comprises:
   a first identifier indicating application data providing execution results of an application program; and
   a second identifier indicating image information for each page of said application data, said image information being created for printing said application data.

3. A method for managing a video browsing data selecting program stored on a computer readable medium, said method comprising the steps of:
   a) inputting video data including a plurality of sequential image frames and sequential audio data corresponding to each of said image frames;
   b) extracting a selected one of the video data and image data corresponding to at least one of said image frames as browsing data for each scene included in said video data;
   c) detecting an image frame corresponding to each scene based on the contents of said input video data;
   d) detecting the volume of the input audio data corresponding to the detected image frame; and
   e) selecting the browsing data for each detected image frame.

4. A method for displaying browsing data corresponding to data based on a plurality of application programs, said method comprising the steps of:
   a) creating browsing data indicating contents of a plurality of data output by executing said application program, wherein said plurality of data output is visible data and non-visible data; and
   b) displaying said browsing data created in said step a) on a screen of a display means.

5. A method for managing media data in an information processing program stored on a computer readable medium, said method comprising the steps of:
   a) creating or inputting media data based on an application program for editing, playing, or storing the media data;
   b) creating bit-map image browsing data associating contents of each data output by said step a) if said data output by said step a) is and non-visible data;
   c) associating the data output by said step a) with the browsing data;
   d) storing said data, said browsing data and the association output by said step c); and
   e) displaying a plurality of said data output by said step a) and the browsing data corresponding to said plurality of data as pairs of display data.

* * * * *